3,362,956
1-[(HETEROCYCLYL)-LOWER-ALKYL]-4-
SUBSTITUTED-PIPERAZINES
Sydney Archer, Bethlehem, N.Y., assignor to Sterling
Drug Inc., New York, N.Y., a corporation of
Delaware
No Drawing. Filed Aug. 19, 1965, Ser. No. 481,075
4 Claims. (Cl. 260—268)

This is a continuation-in-part of my prior application Ser. No. 254,475, filed Jan. 28, 1963, now abandoned.

This invention relates to certain 1-[(heterocyclyl)-lower-alkyl]-4-substituted-piperazines, their acid-addition and quaternary ammonium salts, and to intermediates and processes therefor.

The compounds of the invention are represented by the general formula:

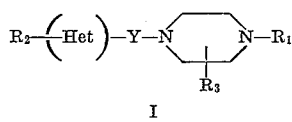

I wherein $R_1$ is a lower-alkyl, hydroxy-lower-alkyl, phenyl or substituted-phenyl, phenyl-lower-alkyl, or substituted-phenyl-lower-alkyl, benzhydryl or substituted-benzhydryl, phenyl-lower-alkenyl or substituted-phenyl-lower-alkenyl, or pyridyl radical; $R_3$ is hydrogen or from one to two lower-alkyl radicals; Y is lower-alkylene of from one to six carbon atoms; and Het is a heterocyclic radical selected from the group consisting of bicyclic aromatic nitrogen heterocyclic radicals having fused five and six membered rings and containing from two to three ring nitrogen atoms which can be in any position of the two rings, for example, radicals derived from indazole (e.g. 2-azaindole, 4-azaindole, 5-azaindole, 6-azaindole, 7-azaindole), pyrrolo[2,3-d]-pyrimidine, benzimidazole, and pyrido[2,1-c]-s-triazole; a benz[g]-3-indolyl radical; a 4(5)-imidazolyl radical; a 3-thianaphthenyl radical; a 3-quinolyl radical; a 3,4-dihydro-1-isoquinolyl radical; or 1,2,3,4-tetrahydro-1-isoquinolyl radical or such heterocyclic radicals substituted in any available position by from one to three substituents, defined hereinafter as $R_2$, selected from the group consisting of lower-alkyl, for example, methyl, ethyl, propyl, and isobutyl; lower-alkoxy, for example, methoxy, ethoxy, propoxy, and butoxy; halogen, including fluorine, chlorine, bromine, and iodine; lower-alkylmercapto, for example, methylmercapto, ethylmercapto, propylmercapto, and isobutylmercapto; lower-alkylsulfinyl, for example, methylsulfinyl, ethylsulfinyl, propylsulfinyl, and isobutylsulfinyl; lower-alkylsulfonyl, for example, methylsulfonyl, ethylsulfonyl, propylsulfonyl, isopropylsulfonyl; trifluoromethyl; hydroxy; methylenedioxy; or ethylenedioxy, wherein the lower-alkyl moiety of the said substituents contain from one to four carbon atoms.

In the above general Formula I, where $R_1$ represents a lower-alkyl radical, it can be straight or branched and can contain from one to about six carbon atoms and thus stands, inter alia, for methyl, ethyl, isobutyl, n-hexyl, and the like.

When $R_1$ represents an hydroxy-lower-alkyl radical, it can be straight or branched, can contain from two to six carbon atoms and is such that the oxygen atom of the hydroxy-lower-alkyl group and the nitrogen atom of the piperazine ring are separated by at least two carbon atoms. $R_1$ thus also stands, inter alia, for 2-hydroxyethyl, 3-hydroxy-1-methylpropyl, 6-hydroxyhexyl, and the like.

When $R_1$ represents a phenyl or substituted-phenyl, phenyl-lower-alkyl or substituted-phenyl-lower-alkyl, benzhydryl or substituted-benzhydryl, or phenyl-lower-alkenyl or substituted-phenyl-lower-alkenyl radical, the phenyl moiety of said radicals can be substituted by from one to three substituents selected from the group consisting of halogen (including fluorine, chlorine, bromine, and iodine), lower-alkyl, hydroxy, lower-alkoxy, methylenedioxy, ethylenedioxy, lower-alkylmercapto, lower-alkylsulfinyl, lower-alkylsulfonyl, and trifluoromethyl. When more than one of such substituents is present, they can be the same or different and can occupy any of the available positions on the benzene ring. When the substituent is a lower-alkyl, lower-alkoxy, lower-alkylmercapto, lower-alkylsulfinyl, or lower-alkylsulfonyl group, the lower-alkyl portion of said groups can be straight or branched and can contain from one to about four carbon atoms. When $R_1$ represents a phenyl-lower-alkyl radical, the lower-alkyl moiety of said radical can contain from one to four carbon atoms, and when $R_1$ represents a phenyl-lower-alkenyl radical, the lower-alkenyl moiety of said radical can contain from three to four carbon atoms. Thus $R_1$ represents, inter alia, phenyl, benzyl, phenethyl, 4-phenyl-butyl, benzhydryl, or cinnamyl, or such radicals substituted in the phenyl ring by one or more of such substituents, inter alia, as fluoro, chloro, bromo, iodo, methyl, isobutyl, hydroxy, methoxy, n-butoxy, methylenedioxy, ethylenedioxy, methylmercapto, isopropylmercapto, methylsulfinyl, isopropylsulfinyl, methylsulfonyl, isopropylsulfonyl, or trifluoromethyl.

In the above general Formula I, the group $R_3$ represents a hydrogen atom or from one to two lower-alkyl groups each of which can contain from one to four carbon atoms. When $R_3$ represents two lower-alkyl groups they can be the same or different and can be attached to the same or different carbon atoms of the piperazine ring. Thus $R_3$ represents, inter alia, 3-methyl, 6-methyl, 2-n-butyl, 3-isopropyl, 2,2-dimethyl, 2,5-dimethyl, 2,6-dimethyl, 3,6-dimethyl, or 2,5-di-n-propyl.

In the above general Formula I, the group Y represents lower-alkylene of from one to six carbon atoms, can be straight or branched, and when the group Y is attached to a nitrogen atom of the heterocyclic group, Het, is such that at least two carbon atoms separate the nitrogen atoms of the heterocyclic group and the piperazine ring. The lower-alkylene group, Y, thus stands, inter alia, for methylene, 1,2-ethylene, 1,3-propylene, 2-methyl-1,4-butylene, 1,6-hexylene, and the like.

The invention also comprehends compounds of Formula I where the heterocyclic group, Het, is a 2-(1,4-benzodioxanyl) radical, Y is methylene or 1,2-ethylene, and $R_1$ is 2-methoxyphenyl or, when Y is 1,2-ethylene, $R_1$ is phenyl. More specifically the compounds 1-{-[2-(1,4-benzodioxanyl)ethyl]}-4-phenylpiperazine; 1 - [2-(1, 4 - benzodioxanyl)methyl] - 4-(2-methoxyphenyl)piperazine; and 1-{2-[2-(1,4-benzodioxanyl)ethyl]}-4-(2-methoxyphenyl)piperazine are considered to be within the purview of the invention.

The compounds of the present invention, where Het is a 2-azaindolyl, 4-azaindolyl, 5-azaindolyl, 6-azaindolyl, 7-azaindolyl, pyrrolo[2,3-d]pyrimidinyl, 3-benz[g]indolyl, 4(5)-imidazolyl, thianaphthenyl, 3-quinolyl, or 2-(1,4-benzodioxanyl) radical, can be prepared by one or more of the following reactions in which Het, $R_1$, $R_2$, $R_3$, and Y have the meanings given above, Hal represents a halogen atom, Alk represents a lower-alkyl radical, and Y' is a single bond or lower-alkylene containing from one to five carbon atoms. The compounds of Formula I where Het is a 1- or 2-benzimidazolyl, pyrido[2,1-c]-s-triazolyl, 3,4 - dihydro - 1-isoquinolyl, or 1,2,3,4-tetrahydro-1-isoquinolyl radical are prepared by other methods to be hereinafter described.

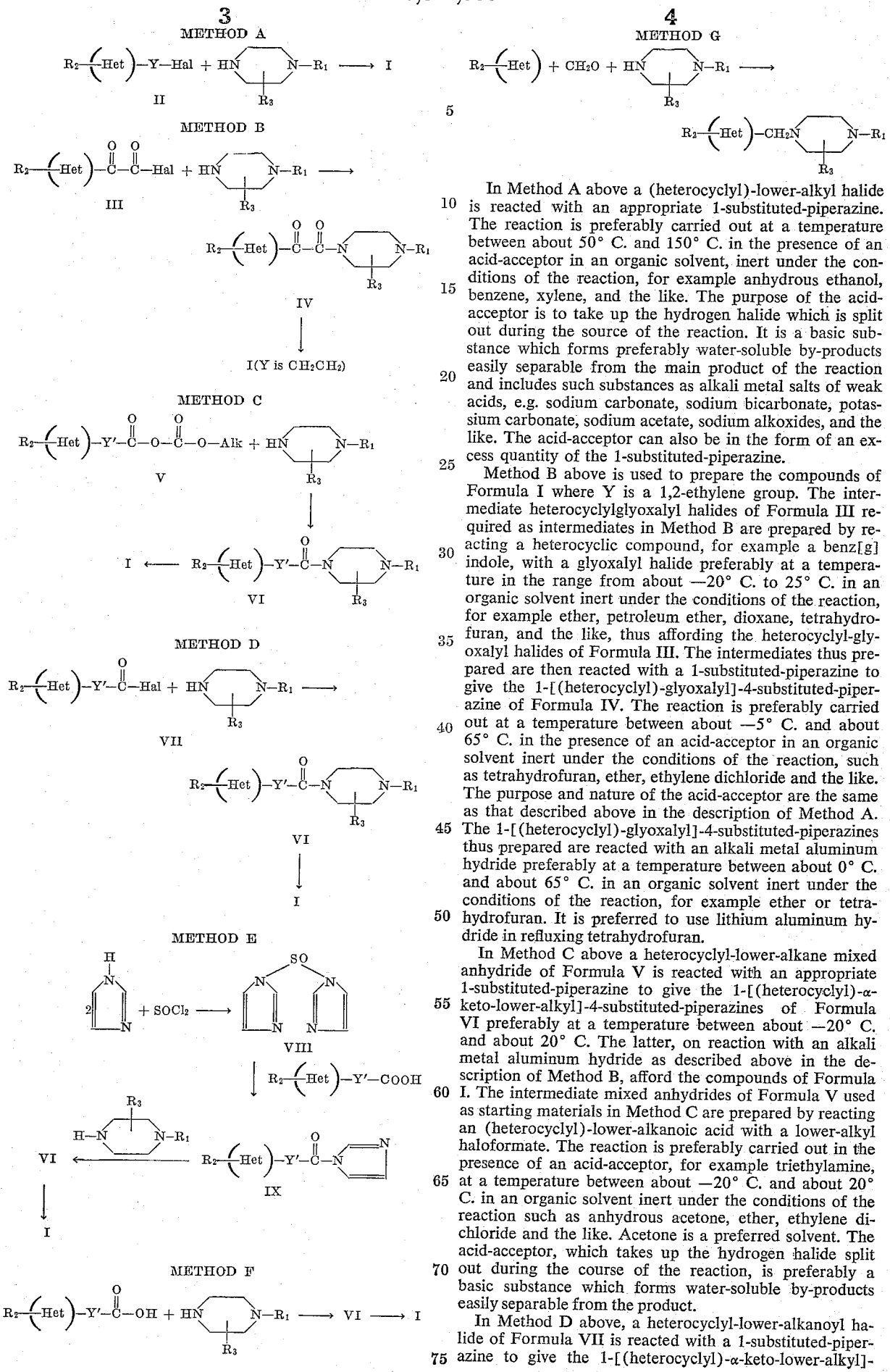

In Method A above a (heterocyclyl)-lower-alkyl halide is reacted with an appropriate 1-substituted-piperazine. The reaction is preferably carried out at a temperature between about 50° C. and 150° C. in the presence of an acid-acceptor in an organic solvent, inert under the conditions of the reaction, for example anhydrous ethanol, benzene, xylene, and the like. The purpose of the acid-acceptor is to take up the hydrogen halide which is split out during the source of the reaction. It is a basic substance which forms preferably water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the 1-substituted-piperazine.

Method B above is used to prepare the compounds of Formula I where Y is a 1,2-ethylene group. The intermediate heterocyclylglyoxalyl halides of Formula III required as intermediates in Method B are prepared by reacting a heterocyclic compound, for example a benz[g]indole, with a glyoxalyl halide preferably at a temperature in the range from about $-20°$ C. to 25° C. in an organic solvent inert under the conditions of the reaction, for example ether, petroleum ether, dioxane, tetrahydrofuran, and the like, thus affording the heterocyclyl-glyoxalyl halides of Formula III. The intermediates thus prepared are then reacted with a 1-substituted-piperazine to give the 1-[(heterocyclyl)-glyoxalyl]-4-substituted-piperazine of Formula IV. The reaction is preferably carried out at a temperature between about $-5°$ C. and about 65° C. in the presence of an acid-acceptor in an organic solvent inert under the conditions of the reaction, such as tetrahydrofuran, ether, ethylene dichloride and the like. The purpose and nature of the acid-acceptor are the same as that described above in the description of Method A. The 1-[(heterocyclyl)-glyoxalyl]-4-substituted-piperazines thus prepared are reacted with an alkali metal aluminum hydride preferably at a temperature between about 0° C. and about 65° C. in an organic solvent inert under the conditions of the reaction, for example ether or tetrahydrofuran. It is preferred to use lithium aluminum hydride in refluxing tetrahydrofuran.

In Method C above a heterocyclyl-lower-alkane mixed anhydride of Formula V is reacted with an appropriate 1-substituted-piperazine to give the 1-[(heterocyclyl)-α-keto-lower-alkyl]-4-substituted-piperazines of Formula VI preferably at a temperature between about $-20°$ C. and about 20° C. The latter, on reaction with an alkali metal aluminum hydride as described above in the description of Method B, afford the compounds of Formula I. The intermediate mixed anhydrides of Formula V used as starting materials in Method C are prepared by reacting an (heterocyclyl)-lower-alkanoic acid with a lower-alkyl haloformate. The reaction is preferably carried out in the presence of an acid-acceptor, for example triethylamine, at a temperature between about $-20°$ C. and about 20° C. in an organic solvent inert under the conditions of the reaction such as anhydrous acetone, ether, ethylene dichloride and the like. Acetone is a preferred solvent. The acid-acceptor, which takes up the hydrogen halide split out during the course of the reaction, is preferably a basic substance which forms water-soluble by-products easily separable from the product.

In Method D above, a heterocyclyl-lower-alkanoyl halide of Formula VII is reacted with a 1-substituted-piperazine to give the 1-[(heterocyclyl)-α-keto-lower-alkyl]-

4-substituted-piperazines of Formula VI. The reaction is preferably carried out at a temperature in the range from about −5° C. to 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[(heterocyclyl)-α-keto-lower-alkyl]-4-substituted-piperazines of Formula VI thus prepared are then reduced with an alkali metal aluminum hydride as described above in the description of Method C.

The 1-[(heterocyclyl)-α-keto-lower-alkyl] - 4 - substituted-piperazines of Formula VI can also be prepared according to Method E or F. In Method E, N,N'-thionyldiimidazole of Formula VIII is first prepared by reacting imidazole with thionyl chloride. The former is then reacted with a heterocyclyl-lower-alkanoic acid, and the resulting N-(heterocyclyl - lower - alkanoyl)imidazole of Formula IX is reacted with a 1-substituted-piperazine to produce the 1-[(heterocyclyl)-α-keto-lower-alkyl]-4-substituted-piperazine of Formula VI. If desired the N,N'-thionyldiimidazole and the N-(heterocyclyl-lower-alkanoyl)imidazole intermediates can be isolated prior to reaction in the next succeeding step, but it is advantageous to carry out the entire sequence of steps up to the formation of the 1-[(heterocyclyl)-α-keto-lower-alkyl]-4-substituted-piperazines of Formula VI in essentially one operation, that is by reacting each intermediate without isolation with the next succeeding reactant using the same solvent medium for the entire sequence of reactions. Suitable solvents are organic solvents inert under the conditions of the reactions, for example tetrahydrofuran, diethyl ether, dibutyl ether, and the like. The reactions are preferably conducted at a temperature in the range from about −10° C. to about 50° C.

Alternatively the 1 - [(heterocyclyl) - α - keto - lower-alkyl]-4-substituted-piperazines of Formula VI can be prepared according to Method F. This method requires the direct interaction of a heterocyclyl-lower-alkanoic acid with a 1-substituted-piperazine. The reaction is preferably conducted by direct fusion of the acid and the amine in the absence of any solvent and at a temperature sufficiently high to expel the water formed in the reaction. For this purpose, a temperature in the range from about 130° C. to 350° C. is suitable.

The 1-[(heterocyclyl)-α-keto-lower-alkyl] - 4 - substituted-piperazines of Formula VI produced in each of Methods E and F are then reduced with an alkali metal aluminum hydride to the final products of Formula I as described above in the description of Method C.

Method G is used to prepare compounds of Formula I wherein Het is an aza-3-indolyl or benz[g]-3-indolyl radical and the alkylene chain, Y, is methylene. The reaction is carried out by reacting an azaindole or a benz[g]indole with formaldehyde and an appropriate 1-substituted-piperazine preferably at a temperature between 50° C. and about 150° C. The formaldehyde can be in the form of an aqueous solution, i.e. 40% formalin solution, or a polymeric form of formaldehyde such as paraformaldehyde or trioxymethylene. When such polymeric forms are used, a molar excess of mineral acid, for example hydrochloric acid, is added to regenerate the free aldehyde from the polymer. The reaction is preferably carried out in an organic solvent, inert under the conditions of the reaction, such as ethanol, methanol or 3-methylbutanol.

The compounds of Formula I where Het is a 1-benzimidazolyl radical are prepared by reacting a 2-nitro-N-(halo-lower-alkyl)-aniline with a 1-substituted-piperazine. The reaction is preferably carried out at a temperature in the range from about 50° C. to about 175° C. in the presence of an acid-acceptor, the purpose and nature of which are the same as that given above in the description of Method A. The nitro group of the resulting 1-[(2-nitrophenylamino)-lower-alkyl] - 4-substituted-piperazine derivative is reduced with hydrogen over a suitable catalyst, for example palladium-on-charcoal or Raney nickel, in an organic solvent inert under the conditions of the reaction, for example a lower-alkanol, to give the corresponding 1-[(2-aminophenylamino)-lower-alkyl]-4-substituted-piperazine derivative. Reaction of the latter with formic acid affords the compounds of Formula I where Het is a 1-benzimidazolyl radical. The latter reaction is preferably carried out using excess formic acid as the solvent at the reflux temperature of the medium. The procedure is illustrated by the following reaction sequence where $R_1$, $R_2$, $R_3$, and Hal have the meanings given above.

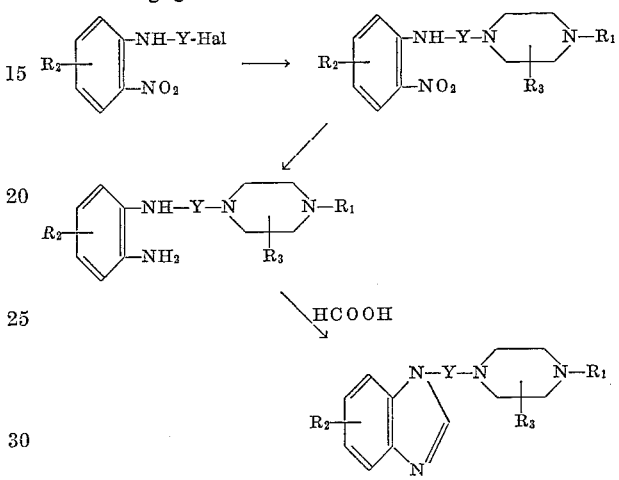

The 2-nitro-N-(halo-lower-alkyl)anilines required as starting materials are prepared by reacting a 2-halo-nitrobenzene with an amino-lower-alkanol to give a 2-nitro-N-(hydroxy-lower-alkyl)aniline which is then reacted with a halogenating agent, for example a thionyl halide, to give the desired 2-nitro-N-(halo-lower-alkyl) aniline.

The compounds of Formula I where Het is a 2-benzimidazolyl radical are prepared by reacting a 1-(cyano-lower-alkyl)-4-substituted-piperazine with an o-phenylenediamine in the presence of a lower-alkanol and anhydrous hydrogen chloride. The reaction is preferably carried out in an organic solvent inert under the conditions of the reaction, for example chloroform, ethylene dichloride, benzene and the like. The procedure is illustrated by the following reaction sequence where $R_1$, $R_2$, $R_3$ and Y have the meanings given above:

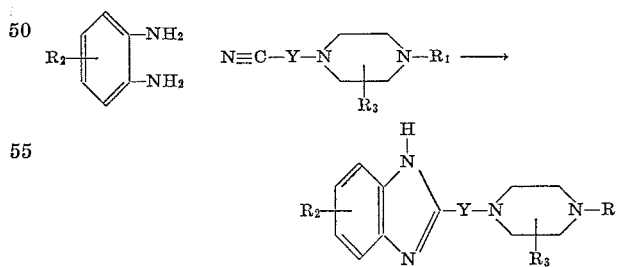

The 1-(cyano-lower-alkyl)-4-substituted-piperazines required as starting materials are prepared by reacting a 1-substituted-piperazine with a halo-lower-alkyl-nitrile preferably in the presence of an acid-acceptor. The nitriles where Y is 1,2-ethylene are conveniently prepared by reacting a 1-substituted-piperazine with acrylonitrile.

The compounds of Formula I where Het is a 3-pyrido-(2,1-c)-s-triazolyl radical are prepared by reacting a 2-hydrazinopyridine with a 1-(4-substituted-piperazinyl)-lower-alkanoic acid. The reaction is preferably carried out in the absence of a solvent and at a temperature sufficiently high to ensure distillation of the water formed in the reaction, and for this purpose a temperature in the range from about 110° C. to about 350° C. is suitable. The reaction is illustrated by the following reaction sequence where $R_1$, $R_2$, $R_3$, and Y have the meanings given above.

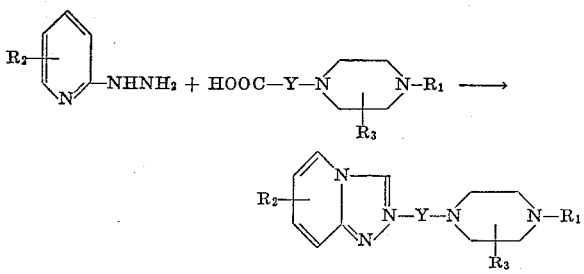

The 1-(4-substituted-piperazinyl)-lower-alkanoic acids required as starting materials are prepared by alkaline hydrolysis of the corresponding nitriles which in turn are prepared by reaction of a 1-substituted-piperazine with a halo-lower-alkylnitrile preferably in the presence of an acid-acceptor. The nitriles where Y is 1,2-ethylene are advantageously prepared by reacting a 1-substituted-piperazine with acrylonitrile.

The compounds of Formula I where Het is a 3,4-dihydro-1-isoquinolyl radical are prepared by reacting a 1-(halo-lower-alkyl)-3,4-dihydroisoquinoline with an appropriate 1-substituted-piperazine preferably in the presence of an acid-acceptor using the same conditions as those given above in the description of Method A. The 1-(halo-lower-alkyl)-3,4-dihydroisoquinoline intermediates in turn are prepared by reacting an N-(lower-alkanoyl)-2-ethylamine with a dehydrating agent, for example phosphorus oxychloride or phosphorus pentoxide. The procedure for the latter reaction is illustrated by the following reaction for the preparation of 1-chloromethyl-3,4-dihydroisoquinoline itself:

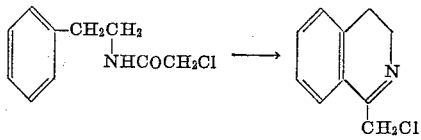

The compounds of Formula I where Het is a 1,2,3,4-tetrahydro-1-isoquinolyl radical are prepared from the corresponding 3,4-dihydro-1-isoquinolyl compounds by catalytically reducing the latter with hydrogen over a suitable catalyst, for example platinum oxide, palladium-on-charcoal, or Raney nickel, and in an organic solvent inert under the conditions of the reaction, for example a lower-alkanol, as illustrated by the following reaction where $R_1$, $R_2$, $R_3$, and Y have the meanings given above.

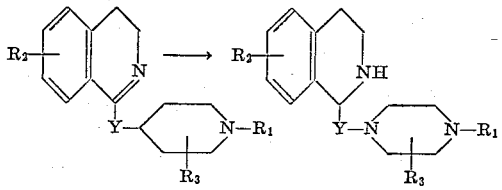

The novel compounds of the instant invention are the bases of Formula I and the acid-addition and quaternary ammonium salts of said bases, and said acid-addition and quaternary ammonium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be prepared.

It will thus be appreciated that Formula I not only represents the structural configuration of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organisms in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(heterocyclyl)-lower-alkyl]-4-substituted-piperazines and not in any particular acid or quaternary moiety or acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organo mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscular system. They depress psychomotor activity as evidenced by studies in mice in standard activity cages; they possess sedative activity as shown by the potentiation of sleeping time in mice induced by ether, thiopental sodium or hexobarbital sodium. When administered to rats, they show adrenolytic activity as evidenced by antagonism of the pressor effects of epinephrine; they lower the rectal temperature in mice; they possess anti-convulsant activity in mice as evidenced by their ability to protect mice from pentylenetetrazol-induced convulsions; they lower the blood pressure in rats; and they show cardiovascular activity in dogs as evidenced by the increase in heart force. These activities indicate their usefulness as tranquilizers, sedatives, adrenolytic agents, hypothermic agents, anti-convulsants, hypotensive agents and cardiovascular agents.

Psychomotor depressant activity data are given for representative compounds in Table 1 below where each of the compounds is identified by the number of the example which follows where its preparation is described, and the activities are generally expressed in terms of an $ED_{50}$, i.e. the Effective Dose$_{50}$, or the effective dose in fifty percent of the animals tested. As used hereinafter the abbreviations i.p., p.o., and s.c. designate intraperitoneal, peroral, and subcutaneous administration, respectively, and unless noted otherwise, dosages are in milligrams per kilogram. (mg./kg.)

TABLE 1.—PSYCHOMOTOR DEPRESSANT ACTIVITY

| Example: | Activity |
|---|---|
| 1 | $ED_{50}=5.3\pm2.8$ (i.p.). |
|   | $ED_{50}=12.7\pm2.95$ (p.o.). |
| 2 | $ED_{50}=2.5\pm1.9$ (i.p.). |
|   | $ED_{50}=2.9\pm2.19$ (p.o.). |
| 3 | $ED_{50}=0.66\pm0.192$ (i.p.). |
|   | $ED_{50}=2.55\pm0.69$ (p.o.). |
| 4 | $ED_{50}=2.75\pm1$ (i.p.). |
|   | $ED_{50}=9.2\pm0.81$ (p.o.). |
| 5 | $ED_{50}=3.8\pm2.12$ (p.o.). |
| 6 | $ED_{50}=0.34\pm0.25$ (i.p.). |
|   | $ED_{50}=1.2\pm0.203$ (p.o.). |
| 7 | $ED_{50}=1.39\pm0.76$ (p.o.). |
| 8 | $ED_{50}=5.0\pm3.7$ (p.o.). |
| 14 | Active at 300 mg./kg. (p.o.). |
| 15 | $ED_{50}=21\pm5.5$ (p.o.). |
| 16 | $ED_{50}=57\pm33.9$ (p.o.). |
| 17 | Active at 100 mg./kg. (i.p. and p.o.). |
| 18 | $ED_{50}=44.8\pm12.9$ (p.o.). |
| 19 | Active at 300 mg./kg. (p.o.). |
| 21 | Active at 100 mg./kg. (p.o.). |
| 23 | $ED_{50}=90.5\pm41.1$ (p.o.). |
| 24 | $ED_{50}=46.5\pm17.6$ (p.o.). |
| 25 | Active at 10 mg./kg. (p.o.). |
| 26 | Active at 30 mg./kg. (p.o.). |

Sedative activity data for representative compounds as obtained in mice using the hexobarbital potentiation test are given below in Table 2.

TABLE 2.—SEDATIVE ACTIVITY

| Example: | Activity |
|---|---|
| 2 | $ED_{50}=3.92\pm1.33$ (i.p.). |
|   | $ED_{50}=2.5\pm0.66$ (p.o.). |
| 3 | $ED_{50}=1.25\pm0.085$ (i.p.). |
|   | $ED_{50}=4.7\pm0.64$ (p.o.). |
| 4 | $ED_{50}=8.0\pm2.2$ (p.o.). |
|   | $ED_{50}=4.0\pm1.6$ (i.p.). |
| 5 | $ED_{50}=1.9\pm0.98$ (i.p.). |
|   | $ED_{50}=6.8\pm1.99$ (p.o.). |
| 6 | $ED_{50}=2.56\pm0.86$ (i.p.). |
|   | $ED_{50}=15.5\pm3.55$ (p.o.). |
| 7 | $ED_{50}=1.39\pm0.296$ (i.p.). |
|   | $ED_{50}=3.3\pm0.54$ (p.o.). |
| 8 | $ED_{50}=56.5\pm13.4$ (i.p.). |
|   | $ED_{50}=43.5\pm10.5$ (p.o.). |
| 9 | $ED_{50}=7.7\pm2.2$ (p.o.). |
| 13 | $ED_{50}=25.5\pm6.68$ (p.o.). |
| 15 | $ED_{50}=4.52\pm0.97$ (i.p.). |
| 22 | $ED_{50}=73\pm17.3$ (i.p.). |

Adrenolytic activity data for representative compounds as obtained by intravenous administration in rats are given in Table 3 below. The dosages in each case are given in micrograms/kilogram.

TABLE 3.—ADRENOLYTIC ACTIVITY

| Example: | Activity |
|---|---|
| 1 | $ED_{50}=30.2$ mcg./kg. |
| 2 | $ED_{50}=10$ mcg./kg. |
| 3 | $ED_{50}=11.8$ mcg./kg. |
| 4 | $ED_{50}=21.5$ mcg./kg. |
| 5 | $ED_{50}=10$ mcg./kg. |
| 6 | $ED_{50}=106$ mcg./kg. |
| 7 | $ED_{50}=80$ mcg./kg. |
| 16 | $ED_{50}=105$ mcg./kg. |
| 19 | $ED_{50}=186$ mcg./kg. |
| 20 | $ED_{50}=94$ mcg./kg. |
| 23 | $ED_{50}=1.34$ mcg./kg. |
| 27 | $ED_{50}=210$ mcg./kg. |

Certain of the compounds of the invention have also been found to have hypothermic activity as evidenced by their ability to lower the rectal temperature in mice. Representative compounds possessing such activity are given below in Table 4.

TABLE 4.—HYPOTHERMIC ACTIVITY

| Example | Dose (i.v.), mg./kg. | Decrease in Temp. (° F.) |
|---|---|---|
| 2 | 1.0 | 2.8 |
| 5 | 1.0 | 1.5 |
| 7 | 1.25 | 4.9 |

Anticonvulsant activity data for representative compounds are given below in Table 5 where the activities are expressed either as an $ED_{50}$ or in terms of the percent animals protected from convulsions at a given dose level.

TABLE 5.—ANTICONVULSANT ACTIVITY

| Example: | Activity |
|---|---|
| 2 | 50% protected at 6.25 to 50 mg./kg. (i.p.) 60% protected at 1.56 to 12.5 mg./kg. (p.o.) |
| 3 | 70% protected at 12.5 mg./kg. (i.p.) |
| 7 | $ED_{50}=1.85\pm0.26$ (i.p.) |

Hypotensive activity data for representative compounds are given below in Table 6 where the activity is expressed in terms of the average effective dose (AED).

TABLE 6.—HYPOTENSIVE ACTIVITY

| Example: | Activity |
|---|---|
| 1 | AED=40 mg./kg. (p.o.). |
| 2 | AED=15 mg./kg. (p.o.). |
| 3 | AED=40 mg./kg. (p.o.). |
| 4 | AED=6 mg./kg. (s.c.). |
| 7 | AED=20 mg./kg. (p.o.). AED=2 mg./kg. (s.c.). |
| 8 | AED=20 mg./kg. (s.c.). |
| 14 | AED=30 mg./kg. (s.c.). |

Certain of the compounds also show cardiovascular activity in dogs as evidenced by their ability to increase the heart force as measured by a strain gauge. Thus at a cumulative dose of 1.85 mg./kg. (i.v.) administered at increments of 0.1 mg., 0.25 mg., 0.5 mg., and 1.0 mg., the compound 1-[2-(7-aza-3-indolyl)ethyl]-4-phenylpiperazine, prepared in Example 3 below, produced an increase in heat force of 82.9% while the blood pressure increased only 2.5% and the heart rate increased only 10.9%.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1-[2-(2-aza-3-indolyl)ethyl]-4-phenylpiperazine

[I; Het is 2-aza-3-indolyl, Y is $CH_2CH_2$, $R_1$ is $C_6H_5$, $R_2$ and $R_3$ are H]

2-nitrocinnamic acid (20 g., 0.103 mole), dissolved in 200 ml. of absolute ethanol, was reduced with hydrogen under about 45 pounds p.s.i. of hydrogen over about 8 g. of Raney nickel at room temperature. When reduction was complete, the catalyst was removed by filtration, and the filtrate was diluted with about 600 ml. of ice water and cooled. The yellow solid which had separated was filtered and dried giving 10.0 g. of 2-aminocinnamic acid, M.P. 155–157° C.

Five grams of the latter were dissolved in 9.4 ml. of 6 N hydrochloric acid. The solution was cooled to 10° C., and a solution of 1.85 g. (0.027 mole) of sodium nitrite in 5 ml. of water was added all at once. The mixture was cooled to 0° C. and a solution of 8.8 g. (0.014 mole) of sodium sulfite in water was added all at once. The reaction mixture was maintained at 0° C. for about thirty minutes, acidified with 19 ml. of glacial acetic acid, warmed slightly on a steam bath and filtered. The filtrate was cooled and the orange solid which separated was collected and air dried giving 8 g. of crude product which was recrystallized from dilute hydrochloric acid giving 2.5 g. of (2-aza-3-indolyl)acetic acid.

The purified product (4.4 g., 0.025 mole) was suspended in 150 ml. of acetone and treated with 2.5 g. (0.025 mole) of triethylamine. The resulting purple solution was cooled to −10° C. and treated with a solution of 3.4 g. (0.025 mole) of isobutyl chloroformate in 20 ml. of acetone. The reaction mixture was maintained at −10° C. to −5° C. for thirty minutes and then treated with a solution of 4.1 g. (0.025 mole) of 1-phenylpiperazine in 20 ml. of acetone. The resulting mixture was maintained at about 0° C. for several hours, cooled to −15° C., and filtered to remove a yellow solid. The filtrate was concentrated to dryness, the residue taken into methylene dichloride, washed with dilute sodium hydroxide, dried over magnesium sulfate, and concentrated to dryness. The residual oil gradually solidified under ether and was collected and recrystallized from ethyl acetate giving 1.0 g. of 1-[(2-aza-3-indolyl)acetyl]-4-phenylpiperazine, M.P. 109–111° C. (uncorr.).

The product (2.6 g., 0.008 mole) was dissolved in about 50 ml. of tetrahydrofuran, and the resulting solution treated with a solution of 2.1 g. (0.055 mole) of lithium aluminum hydride in about 50 ml. of tetrahydrofuran. The mixture was heated and stirred under reflux in a nitrogen atmosphere for five and a half hours, and the excess lithium aluminum hydride was decomposed by the careful addition of dilute sodium hydroxide. The solid was removed by filtration, washed with tetrahydrofuran and the filtrate concentrated to dryness. The resulting solid was extracted with boiling ether and the extracts taken to dryness giving crude material of M.P. 163–173° C. The latter was recrystallized from hot methanol giving 1.5 g. of 1-[2-(2-aza-3-indolyl)ethyl]-4-phenylpiperazine, M.P. 171.5–178.2° C. (corr.).

1 - [2-(2-aza-3-indolyl)ethyl-4-phenylpiperazine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

1-[2-(2-aza-3-indolyl)ethyl]-4-phenylpiperazine can be reacted with hydriodic acid to form 1-[2-(2-aza-3-indolyl)-ethyl]-4-phenylpiperazine trihydriodide, useful as a characterizing intermediate.

1-[2-(2-aza-3-indolyl)ethyl]-4-phenylpiperazine, in the form of its trihydriodide salt, can be converted to the trihydrochloride salt by passing an aqueous solution of the former over an ion-exchange resin saturated with chloride ions, for example, Rohm and Haas' Amberlite® IRA–400 resin.

1-[2-(2-aza-3-indolyl)ethyl]-4-phenylpiperazine can be converted to its trihydriodide salt and the latter recrystallized for purification purposes from an appropriate organic solvent. On suspension of the trihydriodide in dilute aqueous sodium hydroxide, extraction of the suspension with chloroform, and removal of the chloroform from the extracts, 1 - [2-(2-aza-3-indolyl)ethyl]-4-phenylpiperazine can be recovered in purified free base form.

EXAMPLE 2

*1-[2-(2-methyl-7-aza-3-indolyl)ethyl]-4-phenylpiperazine*

[I; Het is 7-aza-3-indolyl, Y is $CH_2CH_2$, $R_1$ is $C_6H_5$, $R_2$ is 2-$CH_3$, $R_3$ is H]

To a solution of dimethylamine (0.35 mole), 80.5 ml. of acetic acid, 29.4 ml. (0.35 mole) of 37% formalin, and 58 ml. of water cooled to 20° C. was added 42.5 g. (0.23 mole) of 2-methyl-7-azaindole in portions over a period of thirty minutes while maintaining the temperature below 27° C. The reaction mixture was stirred at 20° C. for one hour and allowed to stand overnight, cooled to 5° C., and basified with 35% sodium hydroxide. The resulting yellow viscous oil which separated slowly solidified and was collected, dried, slurried with 500 ml. of boiling hexane and filtered giving 44 g. of 3-dimethylamino-methyl-2-methyl-7-azaindole.

Nine grams (0.04 mole) of the latter were suspended in 18.9 ml. (0.23 mole) of concentrated hydrochloric acid and treated with a solution of 11.2 g. (0.23 mole) of sodium cyanide in 1130 ml. of water. After addition of the sodium cyanide was complete, the reaction mixture was heated under reflux for six hours, cooled, and the pale yellow solid which had separated was collected and air dried giving 21 g. of crude material which was recrystallized from ethanol giving 11.1 g. of 3-cyanomethyl-2-methyl-7-azaindole, M.P. 206–208° C.

Nine grams (0.053 mole) of the latter were dissolved in 100 ml. of concentrated hydrochloric acid and the solution heated under reflux for twenty hours. The mixture was cooled and concentrated in vacuo to a small volume, and the tan solid which separated was collected and dissolved in 50 ml. of water, filtered, the pH adjusted to about 8.0 by addition of sodium hydroxide, filtered again, and acidified to pH 5.5 by addition of acetic acid. The mixture was cooled, and the solid which had separated was collected giving 8.1 g. of crude material which was recrystallized from tetrahydrofuran thus affording 7.7 g. of (2-methyl-7-aza-3-indolyl)acetic acid, M.P. 250.6–251.8° C. (corr.).

The product (5.1 g., 0.027 mole) was reacted with 9.0 g. (0.056 mole) of 1-phenylpiperazine in the presence of 2.7 g. (0.027 mole) of triethylamine in acetone, and 3.7 g. (0.027 mole) of isobutyl chloroformate using the manipulative procedure described above in Example 1 thus giving 1-[(2-methyl-7-aza-3-indolyl)acetyl]-4-phenylpiperazine, M.P. 187–189° C. (uncorr.).

The 1 - [(2 - methyl-7-aza-3-indolyl)acetyl]-4-phenylpiperazine (5.2 g., 0.016 mole) was reduced with 3.4 g. (0.09 mole) of lithium aluminum hydride in tetrahydrofuran using the manipulative procedure described above in Example 1. The crude product was recrystallized from isopropanol giving 3.5 g. of 1-[2-(2-methyl-7-aza-3-indolyl)ethyl]-4-phenylpiperazine, M.P. 197.8–199.2° C. (corr.).

EXAMPLE 3

*1-[2-(7-aza-3-indolyl)ethyl]-4-phenylpiperazine*

[I; Het is 7-aza-3-indolyl, Y is $CH_2CH_2$, $R_1$ is $C_6H_5$, $R_2$ and $R_3$ are H]

One gram (0.006 mole) of (7-aza-3-indolyl)acetic acid was warmed in 6 ml. of thionyl chloride for thirty minutes and the excess thionyl chloride then removed in vacuo. The last traces of thionyl chloride was removed by boiling with chloroform and the residue was dissolved in tetrahydrofuran. To the solution was added 3 ml. of 1-phenylpiperazine and the mixture warmed slightly to dissolve all the solid. The reaction mixture was poured into an ice-water mixture, the resulting oil was extracted with methylene dichloride, the extracts dried over magnesium sulfate, and taken to dryness giving a crude solid which was recrystallized from ethyl acetate giving 0.2 g. of 1-[(7-aza-3-indolyl)acetyl]-4-phenylpiperazine, M.P. 174–177° C. (uncorr.).

The 1 - [(7-aza-3-indolyl)acetyl]-4-phenylpiperazine, (2.6 g., 0.008 mole) was reduced with 1.6 g. (0.042 mole) of lithium aluminum hydride in tetrahydrofuran using the manipulative procedure described above in Example 1. The crude product was recrystallized from methanol giving 1.3 g. of 1-[2-(7-aza-3-indolyl)ethyl]-4-phenylpiperazine, M.P. 197.1–199.5° C. (corr.).

EXAMPLE 4

*1-[3-(2-methyl-7-aza-3-indolyl)propyl]-4-(2-methoxy phenyl)-piperazine*

[I; Het is 7-aza-3-indolyl, Y is $(CH_2)_3$, $R_1$ is $2\text{-}CH_3OC_6H_4$, $R_2$ is $2\text{-}CH_3$, $R_3$ is H]

A solution of 0.68 mole of dimethylamine in 154 ml. of 4 N acetic acid and 52.5 ml. (0.68 mole) of 37% aqueous formalin was cooled to 10° C. To the solution was added 82 g. (0.62 mole) of 2-methyl-7-azaindole in portions while maintaining the temperature between 10 and 15° C. The reaction mixture was stirred for several hours at 20° C., neutralized by addition of solid potassium carbonate, diluted with 150 ml. of water, and rendered strongly basic by the addition of 35% sodium hydroxide. The oil which separated solidified on standing and was collected, air dried, and extracted into boiling hexane. The hexane extracts, on cooling, yielded 73 g. of 3-dimethylaminomethyl-2-methyl-7-azaindole, M.P. 109–112° C.

The 3-dimethylaminomethyl-2-methyl-7-azaindole thus obtained (56.7 g., 0.3 mole) was dissolved in 150 ml. of tetrahydrofuran, and the solution diluted with 1500 ml. of anhydrous ether. To the solution was added 42.0 g. (0.3 mole) of methyl iodide, and the mixture was allowed to stand at room temperature overnight. The solid which separated was collected and air dried giving 97 g. of 3-dimethylaminomethyl-2-methyl-7-azaindole methiodide as a creamy white solid, M.P. 196–199° C. (uncorr.).

To a solution of ethanolic sodium ethoxide, prepared by dissolving 6.9 g. (0.3 mole) of sodium in 750 ml. of absolute ethanol, was added 96 g. (0.6 mole) of diethyl malonate followed by 99.4 g. (0.3 mole) of 3-dimethylaminomethyl-2-methyl-7-azaindole methiodide. The reaction mixture was stirred overnight, filtered, and the filtrate poured into 6 liters of cold water. The solid which separated was collected and dried giving 77.5 g. of diethyl [(2-methyl-7-aza-3-indolyl)methyl]malonate, M.P. 105–108° C. The latter (40 g., 0.13 mole) was dissolved in 400 ml. of concentrated hydrochloric acid and the reaction mixture heated under reflux for six hours. The mixture was concentrated to dryness, the residue dissolved in 150 ml. of water, basified with aqueous 35% sodium hydroxide, filtered through filter aid, and the filtrate adjusted to pH 4.5 with acetic acid. The solid which separated was collected, air dried, and recrystallized from 20% aqueous acetone giving 5.7 g. of β-(2-methyl-7-aza-3-indolyl) propionic acid, M.P. 220.6–222.2° C. (corr.).

The β-(2-methyl-7-aza-3-indolyl)propionic acid thus obtained (5.5 g., 0.027 mole) was reacted with 10.6 g. (0.06 mole) of 1-(2-methoxyphenyl)piperazine in the presence of 2.7 g. (0.027 mole) of triethylamine and 3.7 g. (0.27 mole) of isobutyl chloroformate in acetone using the manipulative procedure described above in Example 1. The crude product was recrystallized from an ethyl acetate-hexane mixture giving 6 g. of 1-[β-(2-methyl-7-aza-3-indolyl)propionyl] - 4 - (2 - methoxyphenyl)-piperazine, M.P. 135–138° C. (uncorr.).

The 1 - [β-(2-methyl-7-aza-3-indolyl)propionyl]-4-(2-methoxyphenyl)piperazine (5.3 g., 0.01 mole) was reduced with 3.2 g. (0.08 mole) of lithium aluminum hydride in tetrahydrofuran using the manipulative procedure described above in Example 1. The crude product was recrystallized from ethyl acetate giving 3.2 g. of 1-[3-(2-methyl-7-aza-3-indolyl)-propyl] - 4 - (2 - methoxyphenyl) piperazine, M.P. 132.6–135.0° C. (corr.).

EXAMPLE 5

*1-[3-(7-aza-3-indolyl)propyl]-4-(2-methoxyphenyl) piperazine*

[I; Het is 7-aza-3-indolyl, Y is $(CH_2)_3$, $R_1$ is $2\text{-}CH_3OC_6H_4$, $R_2$ and $R_3$ are H]

To a solution of 36 g. (0.3 mole) of 7-azaindole in 1 liter of n-butanol was added 26.4 g. (0.32 mole) of dimethylamine hydrochloride, 9.9 g. (0.33 mole) of paraformaldehyde, and 200 ml. of n-butanol. The reaction was heated under reflux for thirty minutes, the solvent removed in vacuo, the residual solid dissolved in 300 ml. of water containing 30 ml. of concentrated hydrochloric acid, and the solution extracted with diethyl ether. The aqueous raffinate was basified to pH 12 by addition of solid potassium carbonate, and the solid which separated was collected and air dried giving 42.4 g. of 3-dimethylaminomethyl-7-azaindole, M.P. 152.6–154.0° C. (uncorr.).

Twenty grams (0.12 mole) of the latter and 55.2 g. of diethyl malonate (0.32 mole) were heated to 120° C. To the warm solution was added about 0.5 g. of sodium, and the reaction was heated and stirred at 120° C. for six hours. The reaction mixture was acidified by addition of 120 ml. of 6 N hydrochloric acid and extracted with ether. The aqueous raffinate was adjusted to pH 8 by the addition of solid sodium bicarbonate, and the light green precipitate that separated was collected and oven dried giving 30.8 g. of diethyl [(7-aza-3-indolyl)-methyl] malonate.

The diethyl [(7-aza-3-indolyl)methyl]malonate (30.8 g., 0.11 mole) was refluxed with 60 ml. of concentrated hydrochloric acid for seven hours. The reaction mixture was taken to dryness in vacuo, the residue dissolved in water, and the solution neutralized with saturated aqueous sodium bicarbonate. The resulting solid was collected and oven dried giving 18.0 g. of β-(7-aza-3-indolyl)propionic acid.

Six grams of the β-(7-aza-3-indolyl)propionic acid thus obtained were reacted with 1-(2-methoxyphenyl)-piperazine in the presence of triethylamine and isobutyl chloroformate in acetone using the manipulative procedure described above in Example 1. The product was crystallized from ethyl acetate giving 5.2 g. of 1-[β-(7-aza - 3 - indolyl)propionyl]-4-(2-methoxyphenyl)piperazine, M.P. 143.1–148.0° C.

The product (5.2 g., 0.043 mole) was reduced with lithium aluminum hydride (3.0 g., 0.08 mole) in tetrahydrofuran using the manipulative procedure described above in Example 1. The product was crystallized from ethyl acetate giving 2.4 g. of 1-[3-(7-aza-3-indolyl)propyl] - 4 - (2 - methoxyphenyl)piperazine, M.P. 108.6–109.8° C. (corr.).

EXAMPLE 6

*1-[3-(2-methyl-7-aza-3-indolyl)propyl]-4-phenylpiperazine*

[I; Het is 7-aza-3-indolyl, Y is $(CH_2)_3$, $R_1$ is $C_6H_5$, $R_2$ is $2\text{-}CH_3$, $R_3$ is H] was prepared by reducing 5.5 g. (0.016 mole) of 1-[β-(2-methyl - 7 - aza-3-indolyl)propionyl]-4-phenylpiperazine [prepared from β-(2-methyl-7-aza - 3 - indolyl)propionic acid and 1-phenylpiperazine using the manipulative procedure described above in Example 1] with 3.2 g. (0.08 mole) of lithium aluminum hydride in tetrahydrofuran using the manipulative procedure described above in Example 1. The product was recrystallized from methanol giving 4.2 g. of 1-[3-(2-methyl - 7 - aza - 3 - indolyl)propyl]-4-phenylpiperazine, M.P. 150.8–151.8° C. (corr.).

EXAMPLE 7

*1-[3-(7-aza-3-indolyl)propyl]-4-phenylpiperazine*

[I; Het is 7-aza-3-indolyl, Y is $(CH_2)_3$, $R_1$ is $C_6H_5$, $R_2$ and $R_3$ are H] was prepared by reducing 5.5 g. (0.017 mole) of 1-[β-(7-aza-3 - indolyl)propionyl] - 4 - phenylpiperazine [prepared from β-(7-aza - 3 - indolyl)propionic acid and 1-phenylpiperazine using the manipulative procedure described above in Example 3] with 3.2 g. (0.084 mole) of lithium aluminum hydride in tetrahydrofuran using the manipulative procedure described above in Example 1. The product was recrystallized from ethyl acetate giving 4.6 g. of 1-[3-(7-aza-3-indolyl)propyl]-4-phenylpiperazine, M.P. 149.8–151.8° C. (corr.).

EXAMPLE 8

1-[3-(7-aza-3-indolyl)propyl]-4-(4-methoxyphenyl)-piperazine

[I; Het is 7-aza-3-indolyl, Y is $(CH_2)_3$, $R_1$ is 4-$CH_3OC_6H_4$, $R_2$ and $R_3$ are H]

To a stirred solution of 14.3 g. (0.21 mole) of imidazole in 500 ml. of tetrahydrofuran under a nitrogen atmosphere was added 4.0 cc. (0.052 mole) of thionyl chloride while maintaining the temperature around 20° C. To the mixture containing N,N′-thionyldiimidazole was added 10.0 g. (0.052 mole) of β-(7-aza-3-indolyl)-propionic acid, and the reaction mixture was stirred at room temperature for five hours. The mixture was then treated with a solution of 13.8 g. (0.052 mole) of 1-(4-methoxyphenyl)piperazine dihydrochloride in 20 ml. (0.143 mole) of triethylamine and stirred at room temperature for twelve hours. The solvent was removed under reduced pressure, the residue triturated with water, and the resulting solid collected and dried giving 14.3 g. of 1-[β-(7-aza-3-indolyl)propionyl] - 4 - (4-methoxyphenyl)piperazine, M.P. 180–182° C. (uncorr.).

The latter (15.5 g., 0.042 mole) was reduced with lithium aluminum hydride in tetrahydrofuran using the manipulative procedure described above in Example 1. The crude product was recrystallized from acetone giving 11.5 g. of 1-[3-(7-aza-3-indolyl)propyl]-4-(4-methoxyphenyl)piperazine, M.P. 149.2–150.4° C. (corr.).

EXAMPLE 9

1-[2-(7-aza-3-indolyl)ethyl]-4-(4-methoxyphenyl)-piperazine

[I; Het is 7-aza-3-indolyl, Y is $CH_2CH_2$, $R_1$ is 4-$CH_3OC_6H_4$, $R_2$ and $R_3$ are H]

A mixture of 6.0 g. (0.034 mole) of (7-aza-3-indolyl)-acetic acid and 7.1 g. (0.037 mole) of 1-(4-methoxyphenyl)piperazine was heated at 225° C. under nitrogen for thirty minutes. The cooled residue was dissolved in 50% aqueous ethanol and the solid which separated was collected and dried giving 10 g. of 1-[(7-aza-3-indolyl)-acetyl] - 4 - (4-methoxyphenyl)piperazine, M.P. 150–155° C. (uncorr.). A small sample recrystallized from ethyl acetate gave M.P. 156–158° C. (uncorr.).

The crude product (10.0 g., 0.029 mole) was reduced with 6.5 g. (0.172 mole) of lithium aluminum hydride in 350 ml. of tetrahydrofuran using the manipulative procedure described above in Example 1. The crude product was recrystallized from methanol giving 7.6 g. of 1-[2-(7-aza-3-indolyl)ethyl]-4-(4 - methoxyphenyl)piperazine, M.P. 176.0–177.0° C. (corr.).

EXAMPLE 10

1-[3-(2-methyl-7-aza-3-indolyl)propyl]-4-(4-methylphenyl)piperazine

[I; Het is 7-aza-3-indolyl, Y is $(CH_2)_3$, $R_1$ is 4-$CH_3C_6H_4$, $R_2$ is 2-$CH_3$, $R_3$ is H] was prepared by heating a mixture of 9.0 g. (0.049 mole) of β-(2-methyl-7-aza-3-indolyl)propionic acid and 8.6 g. (0.049 mole) of 1-(4-methylphenyl)piperazine for thirty minutes at 230–245° C. using the manipulative procedure described above in Example 9. There was thus obtained 14.3 g. of 1-[β-(2-methyl - 7 - aza-3-indolyl)propionyl]-4-(4-methylphenyl)piperazine, M.P. 151–155° C. (uncorr.). A small sample recrystallized from ethyl acetate gave material of M.P. 157–160° C. (uncorr.).

Reduction of the latter with 9.0 g. (0.237 mole) of lithium aluminum hydride in 500 ml. of tetrahydrofuran using the manipulative procedure described above in Example 1 and recrystallization of the product from methanol afforded 9.6 g. of 1-[3-(2-methyl-7-aza-3-indolyl)-propyl] - 4 - (4-methylphenyl)piperazine, M.P. 174.0–175.0° C. (corr.).

EXAMPLE 11

1-[2-(7-aza-3-indolyl)ethyl]-4-(4-methylphenyl)piperazine

[I; Het is 7-aza-3-indolyl, Y is $CH_2CH_2$, $R_1$ is 4-$CH_3C_6H_4$, $R_2$ and $R_3$ are H] was prepared by heating a mixture of 7.9 g. (0.045 mole) of (7-aza-3-indolyl)-acetic acid and 8.8 g. (0.049 mole) of 1-(4-methylphenyl)piperazine for thirty-five minutes at 230–245° C. using the manipulative procedure described above in Example 9. There was thus obtained 12.3 g. of 1-[(7-aza-3-indolyl)acetyl] - 4 - (4-methylphenyl)piperazine, M.P. 155–164° C. (uncorr.). A small sample recrystallized from ethyl acetate gave material of M.P. 156–159° C. (uncorr.).

Reduction of 11.6 g. (0.035 mole) of the latter with 7.6 g. (0.20 mole) of lithium aluminum hydride in 500 ml. of tetrahydrofuran using the manipulative procedure described above in Example 1 and recrystallization of the product from methanol afforded 8.5 g. of 1-[2-(7-aza-3-indolyl)ethyl] - 4 - (4-methylphenyl)piperazine, M.P. 189.6–190.0° C. (corr.).

EXAMPLE 12

1-[3-(2-methyl-7-aza-3-indolyl)propyl]-4-(4-methoxyphenyl)piperazine

[I; Het is 7-aza-3-indolyl, Y is $(CH_2)_3$, $R_1$ is 4-$CH_3OC_6H_4$, $R_2$ is 2-$CH_3$, $R_3$ is H] was prepared by heating a mixture of 10.0 g. (0.049 mole) of β-(2-methyl-7-aza-3-indolyl)propionic acid and 10.3 g. (0.054 mole) of 1-(4-methoxyphenyl)piperazine for thirty minutes at 335° C. using the manipulative procedure described above in Example 9. There was thus obtained 17 g. of 1-[β-(2-methyl - 7-aza-3-indolyl)propionyl]-4-(4-methoxyphenyl)-piperazine, M.P. 187–192° C. (uncorr.). A small sample recrystallized from methanol gave material of M.P. 194–197° C. (corr.).

Reduction of 15.5 g. (0.041 mole) of the latter with 9.4 g. (0.25 mole) of lithium aluminum hydride in 500 ml. of tetrahydrofuran using the manipulative procedure described above in Example 1 and recrystallization of the product from methanol afforded 10.1 g. of 1-[3-(2-methyl - 7 - aza - 3 - indolyl)propyl] - 4 - (4 - methoxyphenyl)piperazine, M.P. 161.8–163.2° C. (corr.).

EXAMPLE 13

1-[3-(2-methyl-7-aza-3-indolyl)propyl]-4-(4-chlorophenyl)piperazine

[I; Het is 7-aza-3-indolyl, Y is $(CH_2)_3$, $R_1$ is 4-$ClC_6H_4$, $R_2$ is 2-$CH_3$, $R_3$ is H] was prepared by heating a mixture of 10.0 g. (0.049 mole) of β-(2-methyl-7-aza-3-indolyl)propionic acid and 10.8 g. (0.055 mole) of 1-(4-chlorophenyl)piperazine for twenty minutes at 230–240° C. using the manipulative procedure described above in Example 9. There was thus obtained 14.2 g. of 1-[β-(2 - methyl - 7 - aza-3-indolyl)propionyl]-4-(4-chlorophenyl)piperazine, M.P. 181–183.5° C. (uncorr.). A small sample recrystallized from methanol gave material of M.P. 184–185.5° C. (uncorr.).

Reduction of 13.0 g. (0.034 mole) of the latter with 6.5 g. (0.17 mole) of lithium aluminum hydride in 500 ml. of tetrahydrofuran using the manipulative procedure described above in Example 1 and recrystallization of the product from tetrahydrofuran afforded 8.9 g. of 1-[3-(2 - methyl - 7 - aza - 3 - indolyl)propyl] - 4 - (4-chlorophenyl)piperazine, M.P. 213.2–213.8° C. (corr.).

EXAMPLE 14

1-(2-methyl-7-aza-3-indolyl)methyl-4-methylpiperazine

[I; Het is 7-aza-3-indolyl, Y is $CH_2$, $R_1$ is $CH_3$, $R_2$ is 2-$CH_3$, $R_3$ is H]

A mixture of 6.6 g. (0.05 mole) of 2-methyl-7-azaindole, 3.8 ml. of 37% formalin (0.05 mole), 5 g.

(0.05 mole) of 1-methylpiperazine, and 70 ml. of glacial acetic acid was allowed to stand at room temperature for fifteen hours. The mixture was then poured into 500 ml. of water, and the mixture rendered alkaline by addition of excess solid potassium carbonate and extracted with chloroform. The extracts were dried over sodium sulfate and taken to dryness leaving a pale yellow crystalline solid which was recrystallized twice from ethyl acetate to give 3.1 g. of 1 - (2-methyl-7-aza-3-indolyl)methyl-4-methylpiperazine, M.P. 161.0–164.4° C. (corr.).

In a similar manner there was prepared the following:

1-[3-(7-aza-1-indolyl)propyl]-4-phenylpiperazine, M.P. 73.6–75.8° C. (corr.) [I; Het is 7-aza-1-indolyl, Y is $(CH_2)_3$, $R_1$ is $C_6H_5$, $R_2$ and $R_3$ are H], by lithium aluminum hydride reduction of 1-[β-(7-aza-1-indolyl)propionyl]-4-phenylpiperazine, M.P. 182.6–183.6° C. (corr.) which in turn was prepared by the interaction of β-(7-aza-1-indolyl)propionic acid, 1-phenylpiperazine, and dicyclohexylcarbodiimide in acetone and dimethylformamide;

1 - [2 - (7 - aza - 3 - indolyl)ethyl] - 4 - (3 - methoxyphenyl)piperazine, M.P. 138.0–139.0° C. (corr.) [I; Het is 7-aza-3-indolyl, Y is $CH_2CH_2$, $R_1$ is $3\text{-}CH_3OC_6H_4$, $R_2$ and $R_3$ are H], by lithium aluminum hydride reduction of 1-[(7-aza-3-indolyl)acetyl]-4-(3 - methoxyphenyl)piperazine, M.P. 120–123° C. (uncorr.) which in turn was prepared by heating a mixture of (7-aza-3-indolyl)acetic acid and 1-(3-methoxyphenyl)piperazine with stirring under a nitrogen atmosphere at 230° C. for one hour;

1 - [3 - (7 - aza - 3 - indolyl)propyl] - 4 - (3 - methoxyphenyl)piperazine, M.P. 127.6–129.0° C. (corr.) [I; Het is 7-aza-3-indolyl, Y is $(CH_2)_3$, $R_1$ is $3\text{-}CH_3OC_6H_4$, $R_2$ and $R_3$ are H], by lithium aluminum hydride reduction of 1-[β-(7-aza-3-indolyl)propionyl]-4-(3-methoxyphenyl)piperazine, M.P. 135–137° C. (uncorr.) which in turn was prepared by heating a mixture of β-(7-aza-3-indolyl)propionic acid and 1-(3-methoxyphenyl)piperazine with stirring under a nitrogen atmosphere at 225° C. for thirty minutes;

1 - [3 - (7 - aza - 3 - indolyl)propyl] - 4 - (4 - methylphenyl)piperazine, M.P. 154.8–156.2° C. [I; Het is 7-aza-3-indolyl, Y is $(CH_2)_3$, $R_1$ is $4\text{-}CH_3C_6H_4$, $R_2$ and $R_3$ are H] by lithium aluminum hydride reduction of 1-[β-(7-aza-3-indolyl)propionyl]-4-(4 - methylphenyl)piperazine, M.P. 161–163° C. (uncorr.) which in turn was prepared by heating a mixture of β-(7-aza-3-indolyl)propionic acid and 1-(4-methylphenyl)piperazine with stirring under a nitrogen atmosphere at 230° C. for one hour;

1 - [2 - (7 - aza - 3 - indolyl)ethyl] - 4 - (2 - pyridyl)piperazine, M.P. 153.0–155.2° C. (corr.) [I; Het is 7-aza-3-indolyl, Y is $CH_2CH_2$, $R_1$ is $2\text{-}C_5H_4N$, $R_2$ and $R_3$ are H], by lithium aluminum hydride reduction of 1-[(7-aza-3-indolyl)acetyl]-4-(2-pyridyl)piperazine, M.P. 187–191° C. (uncorr.) which in turn was prepared by heating a mixture of (7-aza-3-indolyl)acetic acid and 1-(2-pyridyl)piperazine with stirring under a nitrogen atmosphere at 230° C. for thirty minutes;

1 - [3 - (7 - aza - 3 - indolyl)propyl] - 4 - (2 - pyridyl)piperazine, M.P. 160.2–162.0° C. (corr.) [I; Het is 7-aza-3-indolyl, Y is $(CH_2)_3$, $R_1$ is $2\text{-}C_5H_4N$, $R_2$ and $R_3$ are H], by lithium aluminum hydride reduction of 1-[β-(7-aza-3-indolyl)propionyl]-4-(2 - pyridyl)piperazine, M.P. 165–167° C. (uncorr.) which in turn was prepared by heating a mixture of β-(7-aza-3-indolyl)propionic acid and 1-(2-pyridyl)piperazine with stirring under a nitrogen atmosphere at 225–235° C. for thirty minutes;

1 - [3 - (7 - aza - 3 - indolyl) - 2 - methylpropyl] - 4 - phenylpiperazine, M.P. 162.8–164.0° C. [I; Het is 7-aza-3-indolyl, Y is $CH_2CHCH_3CH_2$, $R_1$ is $C_6H_5$, $R_2$ and $R_3$ are H], by lithium aluminum hydride reduction of 1-[β-(7-aza - 3 - indolyl)-α-methylpropionyl]-4-phenylpiperazine, M.P. 130–133° C. (uncorr.) which in turn was prepared by heating a mixture of β-(7-aza-3-indolyl)α-methylpropionic acid and 1-phenylpiperazine with stirring under a nitrogen atmosphere at 235–240° C. for thirty minutes; and 1-[3-(7-aza-3-indolyl)propyl]-4 - benzylpiperazine [I; Het is 7-aza-3-indolyl, Y is $(CH_2)_3$, $R_1$ is $C_6H_5CH_2$, $R_2$ and $R_3$ are H], by lithium aluminum hydride reduction of 1-[β-(7-aza-3-indolyl)propionyl]-4 - benzylpiperazine, M.P. 120.0–122.0° C. (corr.) which in turn was prepared by heating a mixture of β-(7-aza-3-indolyl)propionic acid and 1-benzylpiperazine with stirring under a nitrogen atmosphere at 220–230° C. for one hour.

EXAMPLE 15

*1-{2-[4(5)-Imidazolyl]ethyl}-4-phenylpiperazine*

[I; Het is 4(5)-imidazolyl, Y is $CH_2CH_2$, $R_1$ is $C_6H_5$, $R_2$ and $R_3$ are H]

To a solution of 50.6 g. (0.241 mole) of histidine hydrochloride in 125 ml. of water at about 20° C. was added, over a period of about ninety minutes, 630 ml. of 5.25% aqueous sodium hypochlorite. When addition was complete, the reaction mixture was stirred for three hours, the pH adjusted to 8.0 with solid sodium carbonate, and the reaction mixture concentrated to dryness. The residue was extracted with boiling ethyl acetate and the combined extracts evaporated to dryness. The residue was recrystallized from ethyl acetate giving 4(5)-cyanomethylimidazole, M.P. 139° C.

Thirteen grams of the 4(5)-cyanomethylimidazole were suspended in 100 ml. of 2 N sodium hydroxide, the mixture refluxed for three and a half hours under nitrogen, acidified by addition of hydrochloric acid, and concentrated to dryness. The residue was extracted with boiling ethanol, and the extracts, on cooling, yielded 17 g. of [4(5)-imidazolyl]acetic acid hydrochloride, M.P. 220–224° C. (uncorr.).

To a mixture of 17 g. of phosphorus pentachloride and 21 ml. of thionyl chloride heated to 60° C. was added, in portions over a period of ten minutes, 13.5 g. of the [4(5)-imidazolyl]-acetic acid hydrochloride obtained above. The reaction mixture was heated to about 60–65° C. for ninety minutes, then cooled and diluted with chloroform. The resulting brown solid which separated was collected and dried in vacuo giving 13.5 g. of [4(5)-imidazolyl]-acetyl chloride, M.P. 119–124° C. The latter was reacted with 39 g. (0.24 mole) of 1-phenylpiperazine in tetrahydrofuran using the manipulative procedure described above in Example 3. The product was recrystallized from water giving 4.7 g. of 1-{[4(5)-imidazolyl]acetyl}-4-phenylpiperazine, M.P. 175–177° C. (uncorr.).

The above 1-{[4(5)-imidazolyl]acetyl} - 4 - phenylpiperazine was reduced with 4.0 g. (0.10 mole) of lithium aluminum hydride in tetrahydrofuran using the manipulative procedure described above in Example 1. The product was recrystallized from water giving 2.6 g. of 1-{2-[4(5)-imidazolyl]ethyl}-4-phenylpiperazine, M.P. 164.0–165.2° C. (corr.).

EXAMPLE 16

*1-[2-(3-thianaphthenyl)ethyl]-4-phenylpiperazine*

[I; Het is 3-thianaphthenyl, Y is $CH_2CH_2$, $R_1$ is $C_6H_5$, $R_2$ and $R_3$ are H]

A stream of anhydrous hydrogen chloride was passed into a vigorously stirred mixture of 115 g. (0.88 mole) of thianaphthene, 85 g. (1.05 moles) of 37% aqueous formaldehyde, and 85 ml. (1.04 moles) of concentrated hydrochloric acid until the reaction mixture was saturated. A slow stream of hydrogen chloride was passed through the mixture for one hour while maintaining the temperature at about 65° C. The cooled mixture was partitioned between water and a benzene-ether mixture, the organic layer separated and the aqueous layer extracted with benzene-ether. Evaporation of the solvent from the combined organic extracts afforded an oil which was fractionated to give 76 g. of 3-chloromethylthianapthene, B.P. 86–89° C./0.05 mm.

The above 3-chloromethylthianaphthene was refluxed for seventeen hours with 31 g. (0.63 mole) of sodium cyanide in 50 ml. of acetone and 50 ml. of water. The reaction mixture was cooled, water added, the organic layer separated, and the aqueous layer extracted several times with ether. The combined organic extracts were taken to dryness and the residual oil distilled in vacuo giving 48 g. of 3-cyanomethylthianaphthene, B.P. 109–112° C./0.25 mm.

The above 3-cyanomethylthianaphthene was hydrolyzed in a solution of 99 ml. of 35% sodium hydroxide and about 75 ml. of water using the manipulative procedure described above in Example 15. The product was purified by dissolving in sodium bicarbonate and reprecipitating by acidification with hydrochloric acid to gve 45 g. of (3-thianaphthenyl)acetic acid, M.P. 109–111° C.

Twenty grams (0.10 mole) of the (3-thianaphthenyl) acetic acid was heated on a steam bath for thirty minutes with 50 ml. of thionyl chloride. The excess thionyl chloride was boiled off and the last traces co-evaporated with carbon tetrachloride. The residue was dissolved in ether, and the ether solution added to a solution of 34 g. (0.21 mole) of 1-phenylpiperazine in 200 ml. of ether. The solid which separated was collected and recrystallized from ethanol giving 24.5 g. of 1-[(3-thianaphthenyl)acetyl]-4-phenylpiperazine, M.P. 153.0–153.8° C. (corr.). The above 1-[(3-thianaphthenyl)acetyl]-4 - phenylpiperazine (15.1 g., 0.05 mole) was reduced with 7.7 g. (0.25 mole) of lithium aluminum hydride in tetrahydrofuran according to the manipulative procedure described above in Example 1. The product was recrystallized from ethyl acetate giving 11 g. of 1-[2-(3-thianaphthenyl)ethyl]-4-phenylpiperazine, M.P. 69.2–70.6° C. (corr.).

EXAMPLE 17

*1-[(6,7-dimethoxy-2-methyl-3-quinolyl)methyl]-4-phenylpiperazine*

[I; Het is 3-quinolyl, Y is $CH_2$, $R_1$ is $C_6H_5$, $R_2$ is 6,7-di-$CH_3O$-2-$CH_3$, $R_3$ is H]

p-Toluidine (21.5 g., 0.20 mole) was melted by warming, and to the melt was added in portions 39.5 g. (0.19 mole) of 6-nitroveratraldehyde. The mixture was heated to 120° C. on a hot plate, allowed to cool, and the solid mass recrystallized from ethanol giving 47 g. of 2-nitro-4,5-dimethoxybenzal - N - (4 - methylphenyl)imine, M.P. 138–140° C. (uncorr.).

Forty grams of the above imine were dissolved in 1.1 liter of absolute ethanol and the solution heated to boiling. To the hot solution was added a solution of 187 g. of sodium sulfide monohydrate in 53 ml. of water and 53 ml. of ethanol. After the resulting vigorous reaction had subsided, the mixture was refluxed and stirred for five minutes and cooled. The precipitated solid was collected and air dried giving 28 g. of 2-amino-4,5-dimethoxy-benzal-N-(4-methylphenyl)imine.

The above imine (13.2 g., 0.04 mole) was heated on a steam bath with 14.3 g. (0.09 mole) of ethyl acetoacetate containing about 25 drops of piperidine. The resulting melt was poured onto ice, filtered, washed with water, air dried, and recrystallized from ethanol giving 11 g. of ethyl 6,7-dimethoxy-2-methyl-3 - quinolinecarboxylate, M.P. 114–117° C. (uncorr.).

A mixture of 15.5 g. (0.06 mole) of the above ethyl 6,7 - dimethoxy - 2 - methyl - 3 - quinolinecarboxylate, 3.2 g. of potassium hydroxide, 20 ml. of water, and 100 ml. of ethanol was heated on a steam bath for five hours, cooled, diluted to about 120 ml. with water, filtered, and acidified with acetic acid. The solid which separated was collected and air-dried and purified by dissolving in dilute ammonium hydroxide and precipitating by adjusting the pH to 6.8 with acetic acid and sodium acetate thus giving 6 g. of 6.7 - dimethoxy - 2 - methyl - 3 - quinolinecarboxylic acid, M.P. 243–246° C. (uncorr.).

Seven grams (0.03 mole) of the latter were converted to the corresponding acid chloride with 250 ml. of thionyl chloride using the manipulative procedure described above in Example 3 and the acid chloride reacted directly with 15 g. (0.09 mole) of 1-phenylpiperazine in tetrahydrofuran using the manipulative procedure described above in Example 3. The product was recrystallized from ethyl acetate giving 5.3 g. of 1 - [(6,7 - dimethoxy - 2 - methyl-3-quinolyl)carbonyl]-4-phenylpiperazine, M.P. 194–196° C. (uncorr.).

The 1 - [(6,7 - dimethoxy - 2 - methyl - 3 - quinolyl) carbonyl]-4-phenylpiperazine thus obtained (6.6 g., 0.017 mole) was reduced with 6.4 g. (0.17 mole) of lithium aluminum hydride in 250 ml. of tetrahydrofuran using the manipulative procedure described above in Example 1. The product was recrystallized from ethyl acetate giving 1.2 g. of 1-[(6,7-dimethoxy-2-methyl-3-quinolyl) methyl]-4-phenylpiperazine, M.P. 154.6–155.2° C. (corr.).

EXAMPLE 18

*1-[2-(1-benzimidazolyl)ethyl]-4-(2-methoxyphenyl) piperazine*

[I; Het is 1-benzimidazolyl, Y is $CH_2CH_2$, $R_1$ is 2-$CH_3OC_6H_4$, $R_2$ and $R_3$ are H]

A mixture of 5 g. (0.318 mole) of 2-chloronitrobenzene and 61 g. (1.0 mole) of ethanolamine was heated under reflux for five minutes in a 500 ml. flask equipped with a thermometer, reflux condenser, and a stirrer. The reaction mixture was then cooled to room temperature and poured into an ice-water mixture, and the precipitated solid was collected, dried and recrystallized from aqueous ethanol to give 37 g. of 2-nitro-N-(2-hydroxyethyl)-aniline, M.P. 74–78° C. (uncorr.).

Thirty-one grams of the above 2-nitro-N-(2-hydroxyethyl)-aniline (0.17 mole) were suspended in 100 ml. of benzene, and the mixture was heated to the boiling point. To the warm solution was added dropwise over a period of about one hour 47 g. (0.4 mole) of thionyl chloride. When addition was complete, the solvent was removed under reduced pressure and the residual oil taken into ethanol and diluted with water. The solid which separated was collected, dried, and recrystallized from ethanol giving 26 g. of 2-nitro-N-(2-chloroethyl)aniline, M.P. 57–59° C. (uncorr.).

The above 2-nitro-N-(2-chloroethyl)aniline (10.0 g., 0.05 mole) and 19.2 g. (0.1 mole) of 1-(2-methoxyphenyl)piperazine were warmed briefly to 145° C. and the mixture allowed to cool. The partially solid reaction mixture was stirred with ice water, and the solid collected and recrystallized from ethanol giving 11.5 g. of 1 - [2 - (2 - nitrophenylamino)ethyl] - 4 - (2 - methoxyphenyl)piperazine, M.P. 116.5–119.5° C. (uncorr.).

Eleven grams (0.031 mole) of the above 1-[2-(2-nitrophenylamino)ethyl] - 4 - (2 - methoxyphenyl)piperazine were dissolved in 250 ml. of ethanol, and reduced over 10% palladium-on-charcoal under a hydrogen pressure of about 45 pounds p.s.i. When reduction was complete, the catalyst was removed by filtration and the solvent evaporated under reduced pressure. The residue was crystallized from boiling hexane giving 8.3 g. of 1-[2-(2-aminophenylamino)ethyl] - 4 - (2 - methoxyphenyl)piperazine, M.P. 110–114° C.

Seven grams (0.02 mole) of the above 1-[2-(2-aminophenylamino)ethyl] - 4 - (2 - methoxyphenyl)piperazine were refluxed for four and a half hours with 70 ml. of formic acid. The solvent was then removed in vacuo and the residual gum triturated with dilute sodium hydroxide. The supernatant was decanted and the gum taken into ethanol and diluted with a large volume of water. The gum which separated gradually solidified and was collected and recrystallized from ethyl acetate giving 2.2 g. of 1 - [2 - (1 - benzimidazolyl)ethyl] - 4 - (2 - methoxyphenyl)piperazine, M.P. 121.5–122.6° C. (corr.).

EXAMPLE 19

*1-[2-(1-benzimidazolyl)ethyl]-4-phenylpiperazine*

[I; Het is 1-benzimidazolyl, Y is $CH_2CH_2$, $R_1$ is $C_6H_5$, $R_2$ and $R_3$ are H]

Twelve grams (0.06 mole) of 2 - nitro - N - (2 - chloroethyl)-aniline and 19.5 g. (0.12 mole) of 1-phenylpiperazine were heated on a hot plate to 150° C. for five minutes, and the mixture allowed to cool to room temperature. The solid mass was broken up in cold water, filtered and recrystallized from ethanol giving 15.8 g. of 1 - [2 - (2 - nitrophenylamino)ethyl] - 4 - phenylpiperazine, M.P. 114–116° C. (uncorr.).

The latter (3.3 g., 0.01 mole), dissolved in ethanol, was reduced with hydrogen over palladium oxide under a hydrogen pressure of about 36 pounds p.s.i. using the manipulative procedure described above in Example 18. The product was recrystallized from hexane giving 2.1 g. of 1 - [2 - (2 - aminophenylamino)ethyl] - 4 - phenylpiperazine, M.P. 77.6–78.0° C. (corr.).

Eight grams (0.03 mole) of the above 1-[2-(2-aminophenylamino)ethyl]-4-phenylpiperazine were refluxed with 80 ml. of 98% formic acid using the manipulative procedure described above in Example 18. The crude product was recrystallized from ethyl acetate giving 5.5 g. of 1 - [2 - (1 - benzimidazolyl)ethyl] - 4 - phenylpiperazine, M.P. 121.2–122.6° C.

EXAMPLE 20

*1-[2-(2-benzimidazolyl)ethyl]-4-phenylpiperazine*

[I; Het is 2-benzidimidazolyl, Y is $CH_2CH_2$, $R_1$ is $C_6H_5$, $R_2$ and $R_3$ are H]

Acrylonitrile (17.5 g., 0.33 mole) was added over a period of ninety minutes to 48.6 g. (0.3 mole) of 1-phenylpiperazine while maintaining the temperature below 35° C. The reaction mixture was stirred for one hour at 35° C., heated to boiling for one hour, and the excess acrylonitrile removed under reduced pressure. The residue, on cooling, solidified and was collected giving 63 g. of 1-(2-cyanoethyl)-4-phenylpiperazine, M.P. 66–69° C. (corr.).

The above 1 - (2 - cyanoethyl) - 4 - phenylpiperazine (21.5 g., 0.1 mole) was dissolved in 500 ml. of chloroform containing 5.9 ml. of absolute ethanol, and the solution saturated with anhydrous hydrogen chloride. The reaction mixture was taken to dryness under reduced pressure while maintaining the temperature below 20° C. The residual solid was dissolved in 500 ml. of tetrahydrofuran, and the mixture treated with 10.8 g. (0.08 mole) of o-phenylenediamine. The mixture was allowed to stand at room temperature for two hours, refluxed for one and a half hours, poured into water, and the mixture was rendered alkaline with solid potassium hydroxide. On addition of ether, a solid separated which was collected and dried giving 35 g. of crude product. The latter was recrystallized from ethanol giving 2 g. of 1-[2-(2-benzimidazolyl)ethyl]-4-phenylpiperazine, M.P. 200.5–202.9° 69° C. (corr.).

EXAMPLE 21

*1-{2-(3-pyrido[2,1-c]-s-triazolyl)ethyl}-4phenylpiperazine*

[I; Het is 3-pyrido[2,1-c]-s-triazolyl, Y is $CH_2CH_2$, $R_1$ is $C_6H_5$, $R_2$ and $R_3$ are H]

A mixture of 3.5 g. (0.03 mole) of 2-hydrazinopyridine and 7.5 g. (0.032 mole) of β-(4-phenyl-1-piperazinyl)-propionic acid was heated for ten minutes under nitrogen at 200° C. in a flask equipped with a magnetic stirrer and a nitrogen inlet tube. The temperature was then held at 340–350° C. for forty minutes. The mixture was cooled, dissolved in methanol, and chromatographed on a column of silica gel. The first 50 ml. of eluate was discarded, and the next 50 ml. were collected, acidified with a solution of 9 ml. of concentrated hydrochloric acid in 37 ml. of water. The solution was adjusted to pH 3.0–3.2 with dilute sodium hydroxide, cooled, and the resulting tan precipitate collected and dried. The latter was mixed with ethanol and dilute sodium hydroxide, and the mixture extracted with benzene. The benzene extracts, after drying, were evaporated giving a clear viscous gum which solidified. The latter was recrystallized from ethyl acetate giving 1.3 g. of 1-{2-(3-pyrido[2,1-c]-s-triazolyl)ethyl}-4-phenylpiperazine, M.P. 108.8–110.0° C. (corr.).

EXAMPLE 22

*1-[2-(2-methylbenz[g]-3-indolyl)ethyl]-4-phenylpiperazine*

[I; Het is benz[g]-3-indolyl, Y is $CH_2CH_2$, $R_1$ is $C_6H_5$, $R_2$ is 2-$CH_3$, $R_3$ is H]

A solution of 9 g. (0.057 mole) of α-naphthylhydrazine, in 100 ml. of acetone, was heated to boiling on a steam bath, and the solvent was removed by distillation. The residue was dissolved in 50 ml. of acetone and 150 ml. of acetic acid and the mixture heated on a steam bath for one hour. The solvent was removed in vacuo, the residue dissolved in 300 ml. of acetic acid, and the mixture saturated with anhydrous hydrogen chloride. After refluxing for twelve hours, the solvent was removed in vacuo and the residue poured into cold water giving a solid which was collected, dried, dissolved in benzene, and chromatographed on a column of alumina. The fraction melting at 132–139° C. was recrystallized from heptane giving 5.5 g. of 2-methylbenz[g]indole, M.P. 132.5–136° C. (uncorr.).

The above 2-methylbenz[g]indole (5.5 g., 0.03 mole) was dissolved in 75 ml. of anhydrous ether, and the solution treated with a solution of 12.0 g. (0.095 mole) of oxalyl chloride in 20 ml. of ether while stirring and maintaining the temperature at −10° C. When addition was complete, the mixture was stirred for thirty minutes and the yellow precipitate collected, washed with ether and dried, giving 6.5 g. of (2-methylbenz[g]-3-indolyl)-glyoxalyl chloride. The latter (6.5 g., 0.03 mole) was added as a solid over a period of two minutes to a stirred solution of 14.5 g. (0.09 mole) of 1-phenylpiperazine in 250 ml. of tetrahydrofuran while maintaining the temperature at 5° C. The solution was stirred for one hour at 0° C. and for an additional two hours at room temperature and then poured into one liter of an ice-water mixture. The solid which separated was collected, washed with water, air dried, and recrystallized from an ethanol-acetone mixture giving 6.5 g. of 1-[(2-methylbenz[g]-3-indolyl)glyoxalyl]-4-phenylpiperazine, M.P. 295–298° C. (uncorr.).

Six grams (0.015 mole) of the product were reduced with twelve grams (0.03 mole) of lithium aluminum hydride in 400 ml. of tetrahydrofuran using the manipulative procedure described above in Example 1. The crude product was recrystallized from a benzene-ethanol mixture giving 3.4 g. of 1-[2-(2-methylbenz[g]-3-indolyl)-ethyl]-4-phenylpiperazine, M.P. 163.0–165.0° C.

EXAMPLE 23

*1-[(3,4-dihydro-6,7-dimethoxy-1-isoquinolyl)methyl]-4-phenylpiperazine*

[I; Het is 3,4-dihydro-1-isoquinolyl, Y is $CH_2$, $R_1$ is $C_6H_5$, $R_2$ is 6,7-di-$CH_3O$, $R_3$ is H]

Twelve grams (0.05 mole) of N-chloroacetyl-2-(3,4-dimethoxyphenyl)ethylamine were refluxed in 50 ml. of toluene for one hour with 12 ml. of phosphorus oxychloride. The reaction mixture was cooled, diluted with 200 ml. of pentane, and the solid which separated was collected, dissolved in water, and the aqueous solution rendered basic with concentrated ammonium hydroxide. The alkaline solution was extracted with ether, the extracts dried and the solvent removed. The residue was dissolved in anhydrous ether, and the solution added to a solution of 12.3 g. (0.08 mole) of 1-phenylpiperazine in 200 ml. of toluene, and the mixture warmed on a steam bath with stirring for two hours. The solid which separated was removed by filtration and the filtrate taken to dryness giving a gum which, on trituration with methanol, solidified. The crude solid was recrystallized from ethanol giving 5 g. of 1-[(3,4-dihydro-6,7-dimethoxy-1-isoquinolyl)methyl]-4-phenylpiperazine, M.P. 131.8–137.6° C. (corr.).

EXAMPLE 24

*1-[(6,7-dimethoxy-1,2,3,4-tetrahydro-1-isoquinolyl)-methyl]-4-phenylpiperazine trihydrochloride*

[I; Het is 1,2,3,4-tetrahydro-1-isoquinolyl, Y is $CH_2$, $R_1$ is $C_6H_5$, $R_2$ is 6,7-di-$CH_3O$, $R_3$ is H]

Four grams (0.01 mole) of 1-[(3,4-dihydro-6,7-dimethoxy-1-isoquinolyl)methyl]-4-phenylpiperazine were dissolved in 225 ml. of absolute ethanol and reduced over 200 mg. of platinum oxide under a hydrogen pressure of about 50 pounds p.s.i. When reduction was complete, the catalyst was removed by filtration, and the filtrate taken to dryness leaving an oil which crystallized on addition of methanol. The solid was taken into absolute ethanol and treated with an excess of ethanolic hydrogen chloride giving 1-[(6,7-dimethoxy-1,2,3,4-tetrahydro - 1 - isoquinolyl)methyl] - 4 - phenylpiperazine trihydrochloride, M.P. 233.8–235.4° C. (corr.).

EXAMPLE 25

*1-{2-[2-(1,4-benzodioxanyl)]ethyl}4-phenylpiperazine*

[I; Het is 2-(1,4-benzodioxanyl), Y is $CH_2CH_2$, $R_1$ is $C_6H_5$, $R_2$ and $R_3$ are H]

To a solution of 102 g. (1.9 moles) of potassium hydroxide in 900 ml. of water was added 200 g. (2.0 moles) of catechol, and the mixture was warmed on a steam bath until all material had dissolved. The solution was then cooled to 20° C. and treated all at once with 204 g. (2.15 moles) of epichlorohydrin. The reaction mixture was stirred for about eight hours at 50° C. under nitrogen, cooled and extracted with ether. The combined extracts were taken to dryness and the product distilled in vacuo. The fraction boiling at 116–122° C./0.05 mm. was collected to give 183.3 g. of 2-hydroxymethyl-1,4-benzodioxane.

The above 2-hydroxymethyl-1,4-benzodioxane was treated with 45 ml. of phosphorus tribromide while cooling. When addition was complete, the mixture was stirred at room temperature for one hour and then for three hours on a steam bath. The reaction mixture was slurried with water, extracted with chloroform, and the organic extracts washed first with dilute sodium hydroxide and then with water until neutral, dried and taken to dryness in vacuo. The residue was distilled in vacuo and the fraction (144 g.) boiling at 95–97° C./0.035 mm. was collected as 2-bromomethyl-1,4-benzodioxane.

A solution of 69 g. (0.3 mole) of 2-bromoethyl-1,4-benzodioxane and 19.5 (0.28 mole) of potassium cyanide in 170 ml. of ethanol and 50 ml. of water was refluxed for seven and a half hours. The ethanol was removed under reduced pressure, the residue extracted with ether, and the extracts taken to dryness. The residue was distilled in vacuo giving 20.2 g. of crude product which was recrystallized from pentane giving 10 g. of 2-cyanomethyl-1,4-benzodioxane, M.P. 66–69° C. (uncorr.).

A solution of 9 g. (0.05 mole) of 2-cyanomethyl-1,4-benzodioxane in 13 ml. of water, 13 ml. of glacial acetic acid, and 5 ml. of concentrated sulfuric acid was refluxed for twenty hours, cooled, and rendered alkaline with dilute sodium hydroxide. The mixture was extracted with ether, and the raffinate acidified with hydrochloric acid. The oil which separated slowly crystallized and was collected, redissolved in saturated aqueous sodium bicarbonate solution, filtered and acidified with dilute hydrochloric acid. The solid which separated was collected and dried giving 3 g. of [2-(1,4-benzodioxanyl)]acetic acid, M.P. 100–102° C. (uncorr.).

A solution of the above [2-(1,4-benzodioxanyl)]acetic acid (3 g., 0.02 mole) and 5 ml. (0.07 mole) of thionyl chloride in 100 ml. of benzene was refluxed for two hours. The reaction mixture was concentrated to dryness, the residue extracted with boiling pentane, the pentane extracts taken to dryness, and the residue dissolved in ether and treated with a solution of 3.5 g. (0.02 mole) of 1-phenylpiperazine in ether. The solvent was evaporated, the residue treated with dilute acetic acid, and the resulting solid collected by filtration. The latter was suspended in dilute sodium hydroxide, extracted with benzene, and the benzene extracts concentrated to dryness. The residual solid was recrystallized from ethyl acetate giving 2 g. of 1-{[2-(1,4-benzodioxanyl)]acetyl}-4-phenylpiperazine, M.P. 114–117° C. (uncorr.).

The latter (2.0 g., 0.06 mole) was reduced with 2.0 g. (0.05 mole) of lithium aluminum hydride in 100 ml. of tetrahydrofuran using the manipulative procedure described above in Example 1. The product was recrystallized from 70% aqueous ethanol to give 1.3 g. of 1-{2-[2-(1,4-benzodioxanyl)]ethyl}-4-phenylpiperazine, M.P. 95.6–97.8° C. (corr.).

EXAMPLE 26

*1-{2-[2-(1,4-benzodioxanyl)]ethyl}-4-(2-methoxyphenyl)piperazine*

[I; Het is 2-(1,4-benzodioxanyl), Y is $CH_2CH_2$, $R_1$ is 2-$CH_3OC_6H_4$, $R_2$ and $R_3$ are H]

A solution of 10 g. (0.04 mole) of [2-(1,4-benzodioxanyl)]acetyl chloride (prepared from 9 g. of [2-(1,4-benzodioxanyl)]acetic acid as described above in Example 25), in 100 ml. of ether, was reacted with 25 g. of 1-(2-methoxyphenyl)-piperazine in ether using the manipulative procedure described above in Example 25. The crude product was recrystallized from ethanol giving 14.1 g of 1-{[2-(1,4-benzodioxanyl)]acetyl}-4-(2-methoxyphenyl)piperazine, M.P. 89.0–92.4° C. (corr.).

The above 1 - {[2 - (1,4-benzodioxanyl)]acetyl}-4-(2-methoxyphenyl)piperazine (8.0 g., 0.02 mole) was reduced with 8 g. (0.20 mole) of lithium aluminum hydride in tetrahydrofuran using the manipulative procedure described above in Example 1. The product was recrystallized from ethyl acetate giving 4,5 g. of 1-{2-[2-(1,4-benzodioxanyl)]ethyl} - 4-(2 - methoxyphenyl)piperazine, M.P. 75.8–78.6° C. (corr.).

EXAMPLE 27

*1-[2-(1,4-benzodioxanyl)]methyl-4-(2-methoxyphenyl)-piperazine hydrochloride*

[I; Het is 2-(1,4-benzodioxanyl), Y is $CH_2$, $R_1$ is 2-$CH_3OC_6H_4$, $R_2$ and $R_3$ are H]

A solution of 10 g. (0.05 mole of 2-chloromethyl-1,4-benzodioxane, prepared from 2-hydroxymethyl-1,4-benzodioxane and thionyl chloride according to the manipulative procedure described above in Example 25, and 21 g. (0.11 mole) of 1-(2-methoxyphenyl)-piperazine in 75 ml. of xylene was refluxed for twenty-four hours, and the mixture was cooled, filtered, and extracted with dilute hydrochloric acid. The aqueous extracts were rendered alkaline with dilute sodium hydroxide and the resulting oil extracted with ether. The extracts, after drying, were concentrated to an oil which was taken into benzene and chromatographed on a column of activated magnesium silicate adsorbent (Florisil®). The first 50 ml. of eluate was discarded, and the second 50 ml. was evaporated giving a red oil which was dissolved in ether and treated with ethanolic hydrochloric acid. The solid which separated was collected and recrystallized from water giving 6.0 g. of 1-[2-(1,4-benzodioxanyl)]methyl-4-(2-methoxyphenyl)-piperazine hydrochloride, M.P. 203.0–203.8° C. (corr.).

EXAMPLES 28–31

By reacting 4-azaindole, 5-azaindole, 2-methyl-6-azaindole or pyrrolo[2,3-d]pyrimidine with dimethylamine and formaldehyde, reacting the resulting dimethylaminomethylheterocycle with sodium cyanide, hydrolyzing the resulting cyanomethyl heterocycle, all according to the manipulative proceedure described above in Example 2, reacting the resulting (heterocyclyl)acetic acid with isobutyl chloroformate in acetone in the presence of triethylamine, reacting the resulting mixed anhydride with an appropriate 1-substituted-piperazine and reducing the resulting 1 - [(heterocyclyl)acetyl] - 4 - substituted-piperazine with lithium aluminum hydride, all according to the manipulative procedure described above in Example 1, there can be obtained the respective compounds of Formula I in Table 7 below where Y in each instance is 1,2-ethylene, and $R_3$ in each instance is hydrogen.

TABLE 7

| Example | Het | $R_1$ | $R_2$ |
|---|---|---|---|
| 28 | 4-aza-3-indolyl | $HOCH_2CH_2$ | H |
| 29 | 5-aza-3-indolyl | $4\text{-}ClC_6H_4$ | H |
| 30 | 6-aza-3-indolyl | $3\text{-}CH_3C_6H_4$ | $2\text{-}CH_3$ |
| 31 | Pyrrolo[2,3-d]-5-pyrimidinyl | $4\text{-}HOC_6H_4$ | H |

EXAMPLE 32

*1-[6-(2-methyl-7-aza-3-indolyl)hexyl]-4-phenylpiperazine*

[I; Het is 7-aza-3-indolyl, Y is $(CH_2)_6$, $R_1$ is $C_6H_5$, $R_2$ is $2\text{-}CH_3$, $R_3$ is H]

By reducing the β-(2-methyl-7-aza-3-indolyl)propionic acid obtained above in Example 4 with lithium aluminum hydride according to the manipulative procedure described above in Example 1, there can be obtained 3-(2-methyl-7-aza-3-indolyl)propanol.

By reacting the latter with thionyl chloride according to the manipulative procedure described above in Example 3, there can be obtained 3-(2-methyl-7-aza-3-indolyl)propyl chloride.

By reacting the latter with sodium cyanide and hydrolyzing the resulting α-(2-methyl-7-aza-3-indolyl)butyronitrile to the corresponding α-(2-methyl-7-aza-3-indolyl)butyric acid, according to the manipulative procedure described above in Example 2, and reducing the latter with lithium aluminum hydride according to the manipulative procedure described above in Example 1, there can be obtained 4-(2-methyl-7-aza-3-indolyl) butanol.

By reacting the latter with thionyl chloride according to the manipulative procedure described above in Example 3, reacting the resulting 4-(2-methyl-7-aza-3-indolyl)butyl chloride with diethyl malonate in the presence of sodium ethoxide and saponifying the resulting malonate ester according to the manipulative procedure described above in Example 4, there can be obtained ε-(2-methyl-7-aza-3-indolyl)hexanoic acid.

By reacting the latter with isobutyl chloroformate in the presence of triethylamine, reacting the resulting mixed anhydride with 1-phenylpiperazine, and reducing the resulting 1-[ε-(2-methyl-7-aza-3-indolyl)hexanoyl]-4-phenylpiperazine with lithium aluminum hydride, all according to the manipulative procedure described above in Example 1, there can be obtained 1-[6-(2-methyl-7-aza-3-indolyl)hexyl]-4-phenylpiperazine.

EXAMPLES 33–40

By following the manipulative procedure described above in Example 18, substituting for the 6-nitroveratraldehyde used therein, a molar equivalent amount of 4-chloro - 2 - nitrobenzaldehyde, 4-methylmercapto-2-nitrobenzaldehyde, 4-methylsulfinyl-2-nitrobenzaldehyde, 4-methylsulfonyl-2-nitrobenzaldehyde, 4-trifluoromethyl-2-nitrobenzaldehyde, 4-hydroxy-2-nitrobenzaldehyde, 4,5-methylenedioxy-2-nitrobenzaldehyde, or 4,5-ethylenedioxy-2-nitrobenzaldehyde, there can be obtained the compounds of Formula I in Table 8 below where in each case Het is 3-quinolyl, Y is $CH_2$, and $R_1$ is $C_6H_5$.

TABLE 8

| Example: | $R_2$ |
|---|---|
| 33 | $6\text{-}Cl\text{-}2\text{-}CH_3$ |
| 34 | $6\text{-}CH_3S\text{-}2\text{-}CH_3$ |
| 35 | $6\text{-}CH_3SO\text{-}2\text{-}CH_3$ |
| 36 | $6\text{-}CH_3SO_2\text{-}2\text{-}CH_3$ |
| 37 | $6\text{-}CF_3\text{-}2\text{-}CH_3$ |
| 38 | $6\text{-}HO\text{-}2\text{-}CH_3$ |
| 39 | $5,6\text{-}OCH_2O\text{-}2\text{-}CH_3$ |
| 40 | $5,6\text{-}OCH_2CH_2O\text{-}2\text{-}CH_3$ |

EXAMPLES 41–49

By following the manipulative procedure described above in Example 4, substituting for the 1-(2-methoxyphenyl)piperazine used therein a molar equivalent amount of an appropriate 1-substituted-piperazine, there can be obtained the compounds of Formula I in Table 9 below where, in each case, Het is 7-aza-3-indolyl, Y is $(CH_2)_3$, and $R_2$ is $2\text{-}CH_3$.

TABLE 9

| Example | $R_1$ | $R_3$ |
|---|---|---|
| 41 | $3,4\text{-}OCH_2OC_6H_3$ | $3\text{-}CH_3$ |
| 42 | $3,4\text{-}OCH_2CH_2OC_6H_3$ | $6\text{-}CH_3$ |
| 43 | $4\text{-}CH_3SC_6H_4$ | $2\text{-}n\text{-}C_4H_9$ |
| 44 | $4\text{-}CH_3SOC_6H_4$ | $3\text{-}CH(CH_3)_2$ |
| 45 | $4\text{-}CH_3SO_2C_6H_4$ | $2,2\text{-}di\text{-}CH_3$ |
| 46 | $4\text{-}CF_3C_6H_4$ | $2,5\text{-}di\text{-}CH_3$ |
| 47 | $C_6H_5CH_2$ | $2,6\text{-}di\text{-}CH_3$ |
| 48 | $C_6H_5CH\text{—}CHCH_2$ | $3,6\text{-}di\text{-}CH_3$ |
| 49 | $(C_6H_5)_2CH$ | $2,5\text{-}di\text{-}n\text{-}C_3H_7$ |

EXAMPLES 50–58

By following the manipulative procedure described above in Example 2, substituting for the (2-methyl-7-aza-3-indolyl)acetic acid used therein a molar equivalent amount of an appropriate (substituted-7-aza-3-indolyl)acetic acid and reducing the resulting 1-[(substituted-7-aza - 3 - indolyl)acetyl]-4-phenylpiperazine with lithium aluminum hydride according to the manipulative procedure described above in Example 1, there can be obtained the compounds of Formula I in Table 10 below where, in each case, Het is 7-aza-3-indolyl, Y is $CH_2CH_2$, $R_1$ is $C_6H_5$, and $R_3$ is H.

TABLE 10

| Example: | $R_2$ |
|---|---|
| 50 | $5\text{-}CH_3O$ |
| 51 | $5\text{-}Cl$ |
| 52 | $5\text{-}CH_3S$ |
| 53 | $5\text{-}CH_3SO$ |
| 54 | $5\text{-}CH_3SO_2$ |
| 55 | $5\text{-}CF_3$ |
| 56 | $5\text{-}HO$ |
| 57 | $5,6\text{-}OCH_2O$ |
| 58 | $5,6\text{-}OCH_2CH_2O$ |

EXAMPLES 59–67

By following the manipulative procedure described above in Example 1, substituting for the (2-aza-3-indolyl)-acetic acid and 1-phenylpiperazine used therein, molar equivalent amounts of an appropriate (substituted-2-aza-3-indolyl)-lower-alkanoic acid and an appropriate 1-substituted-piperazine, respectively, and reducing the resulting 1 - [(substituted-2-aza-3-indolyl)-lower-alkanoyl]-4-substituted-piperazine with lithium aluminum hydride according to the manipulative procedure described above in Example 1, there can be obtained the compounds of Formula I in Table 11 below, where Het, in each case, is 2-aza-3-indolyl.

TABLE 11

| Example | Y | $R_1$ | $R_2$ | $R_3$ |
|---|---|---|---|---|
| 59 | $(CH_2)_6$ | $CH_3$ | 6-$CH_3$ | 3-$CH_3$ |
| 60 | $(CH_2)_5$ | $CH_2CH_2OH$ | 6-$CH_3O$ | 6-$CH_3$ |
| 61 | $(CH_2)_3$ | $C_6H_5CH_2CH_2$ | 6-$CH_3SO_2$ | 2,6-di-$CH_3$ |
| 62 | $(CH_2)_3$ | $(C_6H_5)_2CH$ | 5-HO | H |
| 63 | $(CH_2)_3$ | $C_6H_5CH$—$CHCH_2$ | H | H |
| 64 | $(CH_2)_3$ | 2-$C_5H_4N$ | H | H |
| 65 | $(CH_2)_3$ | 4-$ClC_6H_4$ | H | H |
| 66 | $(CH_2)_3$ | 3-$CH_3C_6H_4CH$—$CHCH_2$ | H | H |
| 67 | $(CH_2)_3$ | (3-$CH_3OC_6H_4$)$_2CH$ | H | H |

EXAMPLES 68–77

By following the manipulative procedure described above in Example 21, substituting for the 2-hydrazinopyridine and β-(4-phenyl-1-piperazinyl)propionic acid used therein, molar equivalent amounts of an appropriate 2-hydroazino-substituted-pyridine and an appropriate (4-substituted - 1 - piperazinyl)-lower-alkanoic acid, respectively, there can be obtained the compounds of Formula I in Table 12 below, where, in each case, Het is 3-pyrido-[2,1-c]-s-triazolyl.

TABLE 12

| Example | Y | $R_1$ | $R_2$ | $R_3$ |
|---|---|---|---|---|
| 68 | $CH_2$ | $CH_3$ | 5-$CH_3$ | H |
| 69 | $(CH_2)_2$ | $CH_2CH_2OH$ | 5-$CF_3$ | H |
| 70 | $(CH_2)_4$ | $C_6H_5CH_2$ | 5,6-$OCH_2O$ | H |
| 71 | $(CH_2)_6$ | $(C_6H_5)_2CH$ | 5,6-$OCH_2CH_2O$ | H |
| 72 | $CH_2CHCH_3CH_2$ | $C_6H_5CH$—$CHCH_2$ | H | 3-$CH_3$ |
| 73 | $(CH_2)_3$ | 4-$C_5H_4N$ | H | 2,6-di-$CH_3$ |
| 74 | $(CH_2)_3$ | 4-$ClC_6H_4$ | H | H |
| 75 | $(CH_2)_3$ | 4-$CH_3C_6H_4$ | H | H |
| 76 | $(CH_2)_3$ | 3-$CH_3OC_6H_4$ | H | H |
| 77 | $(CH_2)_3$ | 4-$CF_3C_6H_4$ | H | H |

EXAMPLES 78–85

By following the manipulative procedure described above in Example 16, substituting for the 3-thianaphthenylacetic acid and the 1-phenylpiperazine used therein molar equivalent amounts of an appropriate (substituted-3-thianaphthenyl)-lower-alkanoic acid and an appropriate 1-substituted-piperazine, respectively, and reducing the resulting 1-[(substituted-3-thianaphthenyl) lower-alkanoyl]-4-substituted-piperazine with lithium aluminum hydride according to the manipulative procedure described above in Example 1, there can be obtained the compounds of Formula I in Table 13 below where, in each case, Het is 3-thianaphthenyl.

TABLE 13

| Example | Y | $R_1$ | $R_2$ | $R_3$ |
|---|---|---|---|---|
| 78 | $CH_2$ | $CH_3$ | 6-$CH_3$ | H |
| 79 | $(CH_2)_3$ | $CH_2CH_2OH$ | 6-$CH_3O$ | H |
| 80 | $CH_2CHCH_3CH_2$ | $C_6H_5CH_2$ | 6-Cl | 3-$CH_3$ |
| 81 | $(CH_2)_6$ | $(C_6H_5)_2CH$ | 5,6-$OCH_2O$ | 2,6-di-$CH_3$ |
| 82 | $(CH_2)_3$ | $C_6H_5CH$—$CHCH_2$ | 5-$CF_3$ | H |
| 83 | $(CH_2)_3$ | $C_5H_4N$ | 6-$CH_3SO$ | H |
| 84 | $(CH_2)_3$ | 4-$CH_3C_6H_4$ | 6-HO | H |
| 85 | $(CH_2)_3$ | 3-$CH_3OC_6H_4CH_2$ | H | H |

EXAMPLES 86–93

By following the manipulative procedure described above in Example 2, substituting for the (2-methyl-7-aza-3-indolyl)acetic acid and the 1-phenylpiperazine used therein molar equivalent amounts of an appropriate (substituted-benz[g]-3-indolyl)-lower-alkanoic acid and an appropriate 1-substituted-piperazine, respectively, and reducing the resulting 1-[(substituted-benz[g]-3-indolyl) lower-alkanoyl]-4-substituted-piperazine wtih lithium aluminum hydride according to the manipulative procedure described above in Example 1, there can be obtained the compounds of Formula I in Table 14 below where Het, in each case, is benz[g]-3-indolyl.

TABLE 14

| Example | Y | $R_1$ | $R_2$ | $R_3$ |
|---|---|---|---|---|
| 86 | $CH_2$ | $CH_3$ | 5-$CH_3O$ | 3-$CH_3$ |
| 87 | $CH_2CHCH_3CH_2$ | $(CH_2)_3OH$ | 5-F | H |
| 88 | $CH_2CH_2$ | $C_6H_5CH_2CH_2$ | 5-$CF_3$ | H |
| 89 | $(CH_2)_3$ | $(C_6H_5)_2CH$ | 5-$CH_3SO$ | H |
| 90 | $(CH_2)_6$ | $C_6H_5CH$—$CHCH_2$ | H | H |
| 91 | $(CH_2)_3$ | 2-$C_5H_4N$ | H | 2,6-di-$CH_3$ |
| 92 | $(CH_2)_3$ | 4-$ClC_6H_4$ | 5-HO | H |
| 93 | $(CH_2)_3$ | 3,4-$OCH_2OC_6H_3$ | H | H |

EXAMPLES 94–102

By following the manipulative procedure described above in Example 15, substituting for the [4(5)-imidazolyl]-acetic acid and the 1-phenylpiperazine used therein molar equivalent amounts of an appropriate [4(5)-imidazolyl]-lower-alkanoic acid and an appropriate 1-substituted-piperazine, respectively, and reducing the resulting 1-{[4(5)-imidazolyl]-lower - alkanoyl}-4-substituted-piperazine with lithium aluminum hydride according to the manipulative procedure described above in Example 1, there can be obtained the compounds of Formula I in Table 15 below where Het, in each case, is 4(5)-imidazolyl and $R_2$ is H.

TABLE 15

| Example | Y | $R_1$ | $R_3$ |
|---|---|---|---|
| 94 | $CH_2CH_2$ | $C_2H_5$ | H |
| 95 | $(CH_2)_3$ | $(CH_2)_4OH$ | H |
| 96 | $CH_2CHCH_3CH_2$ | $C_6H_5CH_2$ | 3-$CH_3$ |
| 97 | $(CH_2)_6$ | $(C_6H_5)_2CH$ | H |
| 98 | $(CH_2)_3$ | $C_6H_5CH$—$CHCH_2$ | H |
| 99 | $(CH_2)_4$ | 4-$C_5H_4N$ | H |
| 100 | $(CH_2)_3$ | 4-$BrC_6H_4$ | 2,6-di-$CH_3$ |
| 101 | $(CH_2)_5$ | 2-$CH_3SC_6H_4$ | H |
| 102 | $CH_2$ | 3-$CF_3C_6H_4$ | H |

EXAMPLES 103–113

By following the manipulative procedure described above in Example 17, substituting for the 6,7-dimethoxy-2-methyl-3-quinolinecarboxylic acid and the 1-phenylpiperazine used therein molar equivalent amounts of an appropriate (substituted-3-quinolyl)-lower-alkanoic acid and an appropriate 1-substituted-piperazine, respectively, and reducing the resulting 1-[(substituted-3-quinolyl)lower-alkanoyl]-4-substituted-piperazine with lithium aluminum hydride according to the manipulative procedure described above in Example 1, there can be obtained the compounds of Formula I in Table 16 below where Het, in each case, is 3-quinolyl.

TABLE 16

| Example | Y | $R_1$ | $R_2$ | $R_3$ |
|---|---|---|---|---|
| 103 | $CH_2CH_2$ | $CH(CH_3)_2$ | H | H |
| 104 | $(CH_2)_3$ | $CH_2CH_2OH$ | 6-Br-2-$CH_3$ | H |
| 105 | $(CH_2)_3$ | $C_6H_5CH_2$ | H | 2-$CH_3$ |
| 106 | $(CH_2)_3$ | $(C_6H_5)_2CH$ | H | H |
| 107 | $(CH_2)_5$ | $C_6H_5CH{-}CHCH_2$ | H | H |
| 108 | $CH_2CHCH_3CH_2$ | 4-$C_5H_4N$ | 6-F | H |
| 109 | $(CH_2)_3$ | $\overline{OCH_2CH_2O}C_6H_3$ | H | 2,6-di-$CH_3$ |
| 110 | $(CH_2)_3$ | 4-$IC_6H_4$ | H | H |
| 111 | $(CH_2)_6$ | 3-$HOC_6H_4$ | H | H |
| 112 | $(CH_2)_3$ | 3-$CH_3SC_6H_4$ | H | 3-$CH_3$ |
| 113 | $(CH_2)_3$ | 2-$CH_3C_6H_4$ | H | H |

EXAMPLES 114–123

By following the manipulative procedure described above in Example 22 substituting for the N-chloroacetyl-2-(3,4-dimethoxyphenyl)ethylamine and 1-phenylpiperazine used therein molar equivalent amounts of an appropriate N-halo-lower-alkanoyl-2-(substituted - phenyl)ethylamine and an appropriate 1-substituted-piperazine, respectively, and reducing the resulting 1-[(3,4-dihydro-substituted-1-isoquinolyl)-lower - alkanoyl]-4-substituted-piperazine with lithium aluminum hydride according to the manipulative procedure described above in Example 1, there can be obtained the compounds of Formula I in Table 17 below where Het, in each case, is 3,4-dihydro-1-isoquinolyl.

TABLE 17

| Example | Y | $R_1$ | $R_2$ | $R_3$ |
|---|---|---|---|---|
| 114 | $CH_2$ | $CH_3$ | H | H |
| 115 | $(CH_2)_2$ | $(CH_2)_3OH$ | H | 2-$CH_3$ |
| 116 | $(CH_2)_4$ | $C_6H_5CH_2$ | 6-$CF_3$ | H |
| 117 | $CH_2CHCH_3CH_2$ | $(C_6H_5)_2CH$ | H | H |
| 118 | $(CH_2)_3$ | $C_6H_5CH{-}CHCH_2$ | H | H |
| 119 | $(CH_2)_3$ | 4-$C_5H_4N$ | H | 3-$CH_3$ |
| 120 | $(CH_2)_3$ | 3,4-$\overline{OCH_2O}C_6H_3$ | H | H |
| 121 | $(CH_2)_3$ | 3-$CH_3OC_6H_4$ | 5-Br | H |
| 122 | $(CH_2)_3$ | 4-$BrC_6H_4$ | 5-$CH_3S$ | 2,6-di-$CH_3$ |
| 123 | $(CH_2)_3$ | 4-$CF_3C_6H_4$ | H | H |

By following the manipulative procedure described above in Example 24, each of the compounds in Table 17 above can be reduced with hydrogen to give the corresponding compounds where Het is 1,2,3,4-tetrahydro-1-isoquinolyl.

I claim:

1. A compound of the formula

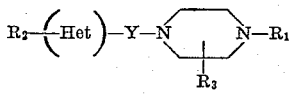

wherein Het is a member of the group consisting of 3-quinolyl; 3,4-dihydro-1-isoquinolyl; and 1,2,3,4-tetrahydro-1-isoquinolyl; $R_1$ is a member of the group consisting of lower-alkyl; hydroxy-lower-alkyl; phenyl; phenyl substituted by from one to three members of the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; phenyl-lower-alkyl; phenyl-lower-alkyl substituted in the benzene ring by from one to three substituents selected from the group consisting of halogen, lower-alkyl, hydroxy, lower-alkoxy, methylenedioxy, ethylenedioxy, lower alkylmercapto, lower-alkylsulfinyl, lower-alkylsulfonyl, and trifluoromethyl; benzhydryl; benzhydryl substituted in either of the two benzene rings by from one to three members of the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; phenyl-lower-alkenyl; phenyl-lower-alkenyl substituted in the benzene ring by from one to three substituents selected from the group consisting of halogen, lower-alkyl, hydroxy, lower-alkoxy, methylenedioxy, ethylenedioxy, lower-alkylmercapto, lower-alkylsulfinyl, lower-alkylsulfonyl, and trifluoromethyl; and pyridyl; $R_2$ is a member of the group consisting of hydrogen and from one to three substituents selected from the group consisting of lower-alkyl, lower-alkoxy, halogen, lower-alkyl-mercapto, lower-alkylsulfinyl, lower-alkylsulfonyl, trifluoromethyl, hydroxy, methylenedioxy, and ethylenedioxy; $R_3$ is a member of the group consisting of a hydrogen atom and from one to two lower-alkyls; and Y is lower alkylene of from one to six carbon atoms.

2. 1 - [(6,7 - dimethoxy - 2 - methyl-3-quinolyl)methyl]-4-phenylpiperazine.

3. 1 - [(3,4 - dihydro - 6,7 - dimethoxy-1-isoquinolyl)methyl]-4-phenylpiperazine.

4. 1 - [(1,2,3,4 - tetrahydro - 6,7 - dimethoxy-1-isoquinolyl)methyl]-4-phenylpiperazine.

(References on following page)

References Cited

UNITED STATES PATENTS

| | | | |
|---|---|---|---|
| 2,909,523 | 10/1959 | Bach et al. | 260—268 |
| 3,004,978 | 10/1961 | Hunger et al. | 260—268 |
| 3,133,056 | 5/1964 | Ash et al. | 260—268 |
| 3,177,219 | 4/1965 | Brossi et al. | 260—268 |

OTHER REFERENCES

Patterson et al., The Ring Index (2nd ed.), pp. 118, 120, 125, 126, 131, 144, 145, 146, 155–159, 207, 208, and 210. 1960.

HENRY R. JILES, *Primary Examiner*.

J. ADAMS, *Assistant Examiner*.

UNITED STATES PATENT OFFICE
CERTIFICATE OF CORRECTION

Patent No. 3,362,956            January 9, 1968

Sydney Archer

It is hereby certified that error appears in the above numbered patent requiring correction and that the said Letters Patent should read as corrected below.

Column 4, line 17, "source" should read -- course --. Column 6, lines 50 to 53, between the two structures insert -- + --. Column 7, lines 8 to 11, the formula should appear as shown below:

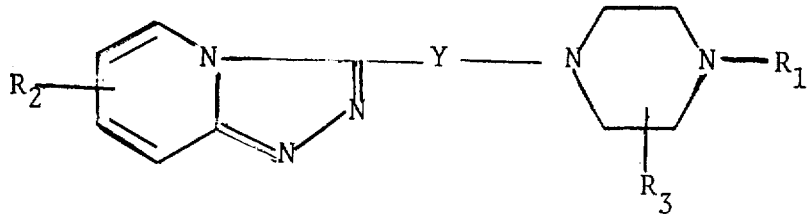

lines 51 to 58, the right-hand formula should appear as shown below:

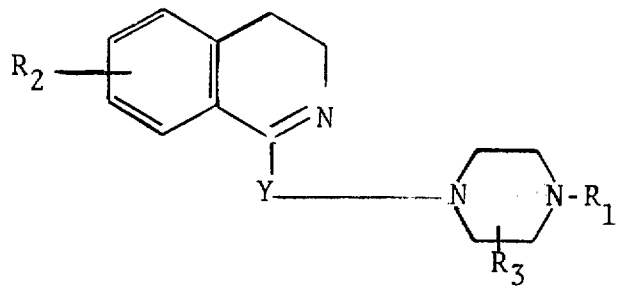

Column 8, line 48, "organisms" should read -- organism --. Column 11, line 66, "heat" should read -- heart --. Column 21, line 15, "gve" should read -- give --. Column 26, line 48, "4,5" should read -- 4.5 --. Column 28, TABLE 9, second column, opposite Example 48, column 29, TABLE 11, second column, opposite Example 63, TABLE 12, second column, opposite Example 72, TABLE 13, second column, opposite Example 82, column 30, TABLE 14, second column, opposite Example 90, TABLE 15, second column, opposite Example 98, column 31, TABLE 16, second column, opposite Example 107, same column 31, TABLE 17, second column, opposite Example 118, "$C_6H_5CH-CHCH_2$", each occurrence, should read -- $C_6H_5CH=CHCH_2$ --. Column 29, TABLE 11, second column, opposite Example 66, "$3-CH_3C_6H_4CH-CHCH_2$" should read -- $3-CH_3C_6H_4CH=CHCH_2$ --.

Signed and sealed this 2nd day of September 1969.

(SEAL)
Attest:
EDWARD M. FLETCHER, JR.      WILLIAM E. SCHUYLER, JR.
Attesting Officer            Commissioner of Patents